United States Patent [19]
Asakura et al.

[11] Patent Number: 6,115,332
[45] Date of Patent: Sep. 5, 2000

[54] APPARATUS FOR RELOCATING, GROUPING AND HOUSING A PLURALITY OF RECORDING MEDIA BASED ON THEIR RECORDING MEDIUM-RELATED INFORMATION

[75] Inventors: Keiichi Asakura; Yasushi Matsumoto, both of Kanagawa, Japan

[73] Assignee: Sony Corporation, Tokyo, Japan

[21] Appl. No.: 09/056,902

[22] Filed: Apr. 7, 1998

[30] Foreign Application Priority Data

Apr. 8, 1997 [JP] Japan .................................. 9-089752

[51] Int. Cl.[7] .................................................. G11B 17/22
[52] U.S. Cl. ............................... 369/34; 369/58; 369/36; 369/59; 360/53
[58] Field of Search ................................. 369/34, 36, 30, 369/83, 32, 56, 59, 57, 58; 707/2, 204; 360/53; 386/46, 83

[56] References Cited

U.S. PATENT DOCUMENTS

| | | | |
|---|---|---|---|
| 4,987,533 | 1/1991 | Clark et al. | 707/204 |
| 5,107,481 | 4/1992 | Miki et al. | 369/59 |
| 5,392,266 | 2/1995 | Kobayashi et al. | 369/36 |
| 5,485,436 | 1/1996 | Forget et al. | 369/36 |
| 5,726,956 | 3/1998 | Kanno | 369/30 |
| 5,862,107 | 1/1999 | Goto | 369/32 |
| 5,883,864 | 3/1999 | Saliba | 369/39 |
| 5,884,298 | 3/1999 | Smith, II et al. | 707/2 |
| 6,035,091 | 3/2000 | Kazo | 386/46 |

FOREIGN PATENT DOCUMENTS 9-7354  1/1997  Japan .................... G11B 27/00

*Primary Examiner*—Tan Dinh
*Assistant Examiner*—Kim-Kwok Chu
*Attorney, Agent, or Firm*—Limbach & Limbach LLP

[57] ABSTRACT

A reproducing apparatus for a recording medium on which information signals and information indicating the type of the information signals are recorded includes a housing section, a reproducing section, a carrier mechanism, and a controller. The housing section houses plural recording media. The reproducing section reproduces a recording medium. The carrier mechanism takes out a recording medium from the housing section and carries the recording medium to the reproducing section. The controller controls the reproducing section and the carrier mechanism. The controller controls the carrier mechanism on the basis of category information indicating a genre and information related to a reproduction frequency generated on the basis of reproduction hysteresis information of the recording medium, so as to carry out relocation within the housing section of the recording media housed in the housing section.

30 Claims, 15 Drawing Sheets

6,115,332

APPARATUS FOR RELOCATING, GROUPING AND HOUSING A PLURALITY OF RECORDING MEDIA BASED ON THEIR RECORDING MEDIUM-RELATED INFORMATION

BACKGROUND OF THE INVENTION

1. Field of the Invention

This invention relates to a recording medium reproducing apparatus and a control method for a recording medium reproducing apparatus. Particularly, this invention relates to a recording medium reproducing apparatus having a housing section for housing plural recording media, and a control method for a recording medium reproducing apparatus.

2. Description of the Related Art

A recording medium reproducing apparatus which houses plural recording media so as to select and reproduce one of the housed recording media has been proposed. As the reproducing apparatus houses plural recording media, easy storage and editing of the recording media are realized.

The reproducing apparatus is exemplified by a disc reproducing apparatus which uses an optical disc having musical signals recorded thereon as a recording medium so as to reproduce this optical disc.

The disc reproducing apparatus has a disc housing section for housing plural optical discs. For example, 100 optical discs are housed in the disc housing section.

The disc reproducing apparatus has a mechanism for exchanging the optical discs housed in the disc housing section. Using this disc exchange mechanism, the disc reproducing apparatus is capable of continuously reproducing the plural optical discs housed in the disc housing section. For example, the disc exchange mechanism carries out disc exchange operation in accordance with a program inputted by a user.

In most cases, the continuous reproduction of plural optical discs by the disc exchange mechanism is carried out with respect to plural optical discs of the same category, such as, the same genre or the same singer, and therefore reflects the user's preference.

Some of the disc reproducing apparatuses have a memory for storing title information or the like of discs inputted by the user with respect to each of the optical discs housed in the disc housing section. The user manages the optical discs housed in the disc housing section on the basis of the title information of the discs stored in the memory, or information, such as, title and names of tunes, recorded on the discs themselves.

In the disc reproducing apparatus, the number of optical discs to be housed may be increased by enlarging the disc housing section. However, if the number of optical discs to be housed is increased, management by the disc reproducing apparatus or management by the user is complicated. For example, the user will be at a loss which housing position in the disc housing section to be used for housing the optical disc.

Although the optical discs housed in the disc housing section may be managed on the basis of the title information stored in the memory provided in the apparatus, as described above, the user must input the information by using an operating section of the apparatus or a remote controller, and such input operation is complicated and troublesome.

When an optical disc is to be newly housed in the disc housing section, it is troublesome for the user to find a suitable place in the disc housing section because of the relation with the discs already housed therein. For example, in the case where a new disc forms a set with the optical disc already housed in the disc housing section, in the case where a new disc will be reproduced continuously with the already housed disc with a high possibility, or in the case where information of the same genre as information recorded on the already housed disc is recorded on a new disc, it is desired that the new disc is housed near the already housed disc in consideration of arrangement. The "suitable place" in this case is such a place.

If an optical disc is randomly housed at a housing position in the disc housing section, it is difficult to manage the disc. Therefore, the housed disc must be taken out and reentered at a housing position in consideration of the relation with the other discs which are already housed in the disc housing section. This reentering operation is also troublesome to the user. If the optical disc is randomly housed in the disc housing section, the optical discs to be continuously reproduced might be housed apart from each other, and therefore, a long time is required for exchanging the discs.

SUMMARY OF THE INVENTION

It is therefore an object of the present invention to provide a reproducing apparatus of a recording medium which resolves the above-described problem.

It is another object of the present invention provide a control method for a reproducing apparatus of a recording medium which resolves the above-described problem.

According to the present invention, there is provided a reproducing apparatus including a housing section, a reproducing section, a carrier mechanism, and a controller. The housing section houses plural recording media. The reproducing section reproduces a recording medium. The carrier mechanism takes out a recording medium from the housing section and carries the recording medium to the reproducing section. The controller controls the reproducing section and the carrier mechanism. The controller controls the carrier mechanism on the basis of recording medium-related information so as to carry out relocation of the recording media housed in the housing section.

According to the present invention, there is also provided a reproducing apparatus including a housing section, a reproducing section, a carrier mechanism, and a controller. The housing section houses plural recording media. The reproducing section reproduces a recording medium. The carrier mechanism takes out a recording medium from the housing section and carries the recording medium to the reproducing section. The controller controls the reproducing section and the carrier mechanism. The controller controls the carrier mechanism in such a manner that a recording medium completed in reproduction by the reproducing section is housed in a housing area of the housing section where a recording medium having the same recording medium-related information as recording medium-related information of the recording medium completed in reproduction is housed.

According to the present invention, there is also provided a reproducing apparatus. Information signals and information indicating the type of the information signals are recorded on recording media. The apparatus includes a housing section, a reproducing section, a carrier mechanism, and a controller. The housing section houses plural recording media. The reproducing section reproduces a recording medium. The carrier mechanism takes out a recording medium from the housing section and carries the recording medium to the reproducing section. The controller controls the reproducing section and the carrier mechanism. The controller has a storage section in which recording medium-related information corresponding to the recording media housed in the housing section is stored. The controller reads out the recording medium-related information from the storage section, and controls the carrier mechanism on the basis of the read out recording medium-related information so as to carry out relocation of the recording media housed in the housing section.

According to the present invention, there is also provided a reproducing apparatus including a housing section, a reproducing section, a carrier mechanism, and a controller. The housing section houses plural recording media. The reproducing section reproduces a recording medium. The carrier mechanism takes out a recording medium from the housing section and carries the recording medium to the reproducing section. The controller controls the reproducing section and the carrier mechanism. The controller carries out relocation of the recording medium on the basis of reproduction hysteresis information of a recording medium reproduced by the reproducing section.

According to the present invention, there is also provided a control method for a reproducing apparatus. The apparatus has a housing section for housing plural recording media, a reproducing section for reproducing a recording medium, a carrier mechanism for taking out a recording medium from the housing section and carrying the recording medium to the reproducing section, and a storage section in which recording medium-related information corresponding to the recording media housed in the housing section is written. The control method includes reading out the recording medium-related information from the storage section, and controlling the carrier mechanism on the basis of the read out recording medium-related information so as to carry out relocation of the recording media housed in the housing section.

According to the present invention, there is further provided a control method for a reproducing apparatus. The apparatus has a housing section for housing plural recording media, a reproducing section for reproducing a recording medium, a carrier mechanism for taking out a recording medium from the housing section and carrying the recording medium to the reproducing section, and a storage section in which reproduction hysteresis information of each of the recording media housed in the housing section is written. The control method includes reading out the reproduction hysteresis information from the storage section, and controlling the carrier mechanism on the basis of the read out reproduction hysteresis information so as to carry out relocation of the recording media housed in the housing section.

DESCRIPTION OF THE INVENTION

A recording medium reproducing apparatus according to the present invention will now be described in detail with reference to the drawings. In the following embodiment, a disc reproducing apparatus using an optical disc as a recording medium is described. In the following embodiment, an optical disc on which plural pieces of music information and table of contents information as the table of contents of the plural pieces of music information are recorded, or an optical disc on which plural pieces of music information, table of contents information as the table of contents of the plural pieces of music information, and information related to the title of the disc, the name of the player, the name of the composer, the name of the lyricist, the title of each piece of music information, and the genre of the tunes, are recorded, such as, a so-called compact disc, is used as the optical disc. The format of such optical disc is described in, for example, the Japanese Publication of Unexamined Patent Application No.9-7354 (JP-A-09 7354).

Figure 1:
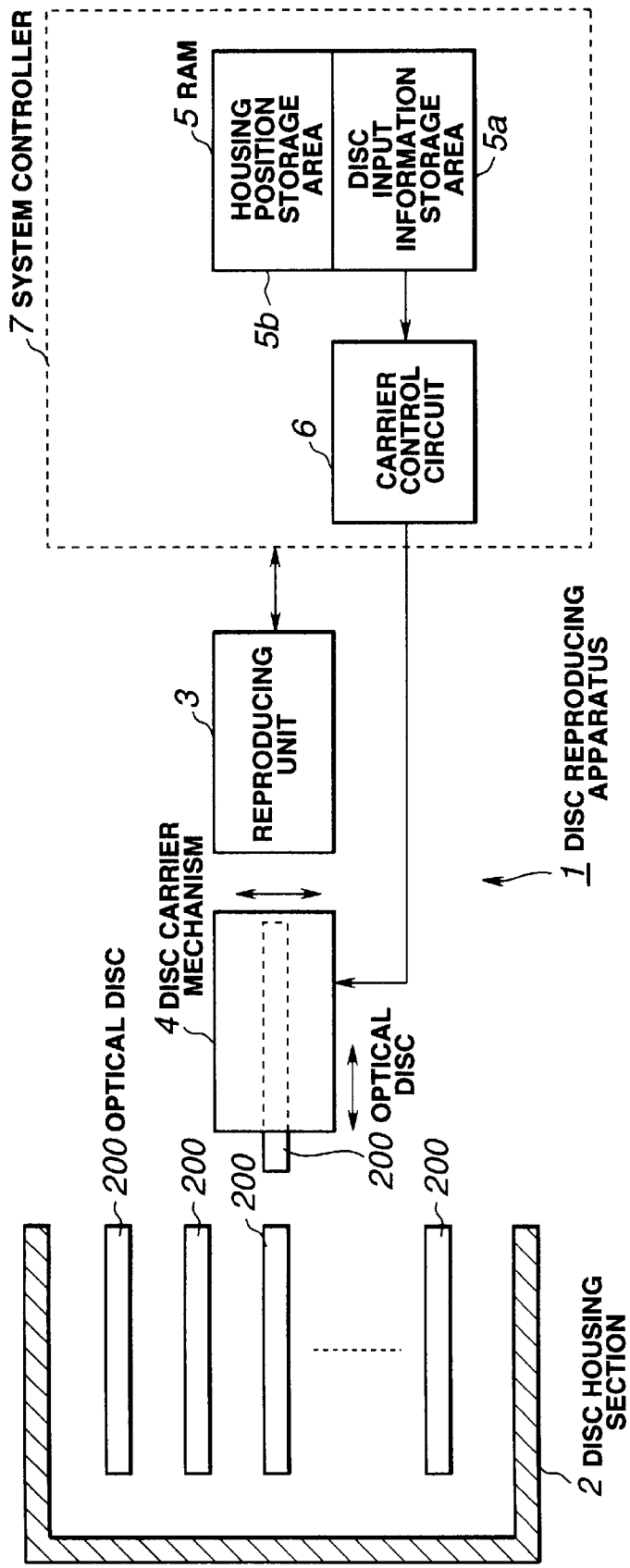
FIG. 1 is a diagram showing the circuit structure of a disc reproducing apparatus as a first embodiment and a second embodiment of the present invention.

A disc reproducing apparatus of a first embodiment has a disc housing section 2 for housing plural optical discs, as shown in FIG. 1. In this disc reproducing apparatus 1, an optical disc 200 of plural optical discs housed in the disc housing section 2 is taken out of the housing section 2 and reproduced.

In the disc reproducing apparatus 1 of the first embodiment, the optical disc 200 is relocated within the disc housing section 2 on the basis of information related to the optical disc 200 housed in the disc housing section 2. That is, the information related to the optical disc 200 is information which is in connection with the other optical discs 200 and is likely to be reproduced continuously with the other optical discs 200.

For example, the information related to the optical disc 200 is information indicating the group to be reproduced continuously with the other optical discs 200, such as, category information indicating the genre or the singer to which the optical disc 200 pertains.

The disc reproducing apparatus 1 has the disc housing section 2 having plural slots for housing plural optical discs 200, a reproducing section 3 for reproducing information signals recorded on the optical disc 200 taken out of the disc housing section 2, a disc carrier mechanism 4 for carrying the optical disc 200 between a housing position in the disc housing section 2 and a reproducing position in the reproducing section 3, a RAM 5 having a disc input information storage area 5a in which the information related to the optical disc 200 read out from the optical disc 200 by the reproducing section 3, such as, the above-mentioned category information, is stored, and a carrier control circuit 6 for controlling the disc carrier mechanism 4 on the basis of the information related to the optical disc 200 recorded in the disc input information storage area 5a in the RAM 5 so as to relocate the optical disc 200 housed in the disc housing section 2.

The RAM 5 has the disc input information storage area 5a in which the above-mentioned category information read out from the optical disc 200 or information related to the title of the optical disc 200 inputted by a user through an operating section of the apparatus is stored, and a housing position storage area 5b in which the housing position of the optical disc 200 is stored. In the area 5a of the RAM 5, the category information of the optical disc is stored at an address corresponding to the address allocated every slot as each housing position in the housing section 2. The information related to the title of the disc, the name of tunes and the genre as described above is not recorded on some of commercial optical discs. In such case, the user inputs necessary information by operating an operating section, not shown, so as to store the information into the RAM 5. If the category information, such as, the genre, is recorded in advance on the optical disc 200, the category information is read out by the reproducing section 3 and written into the area 5a of the RAM 5.

The RAM 5 and the carrier control circuit 6 are provided within a system controller 7. The system controller 7 controls the reproducing section 3, for example.

In the disc housing section 2, plural slots are formed corresponding to the housing positions for separately housing the plural optical discs 200, and the optical discs 200 are separately housed in these slots, respectively. In the housing section 2, a detection mechanism for detecting which slot the optical disc 200 is housed in is provided, though not shown. The result of detection by this detection mechanism is written in the housing position storage area 5b of the RAM 5 in the system controller 7.

The disc carrier mechanism 4 carries the optical disc 200 between the housing section 2 and the reproducing position in the reproducing section 3. The disc carrier mechanism 4 carries out the operation to take out the optical disc 200 housed in the disc housing section 2 and house the optical disc 200 in another slot in the disc housing section 2 in accordance with a flowchart of FIG. 2 as later described.

The disc reproducing apparatus 1 thus constituted enables, in addition to normal reproduction of the optical disc 200, continuous reproduction of plural optical discs 200 by controlling the reproducing section 3 and the disc carrier mechanism 4 by the user operating an operating switch of the operating section, not shown, so as to take out the plural optical discs 200 and continuously reproduce the optical discs 200.

In the disc reproducing apparatus 1, the plural optical discs 200 housed in the housing section 2 may be relocated within the housing section 2 on the basis of the information related to the optical discs 200 stored in the disc input information storage area 5a in the RAM 5, that is, the above-mentioned category information. The information related to the optical discs 200 stored in the disc input information storage area 5a is the category information related to, for example, the genre and the name of the singer of each of the optical discs 200 housed in the disc housing section 2.

Figure 2:
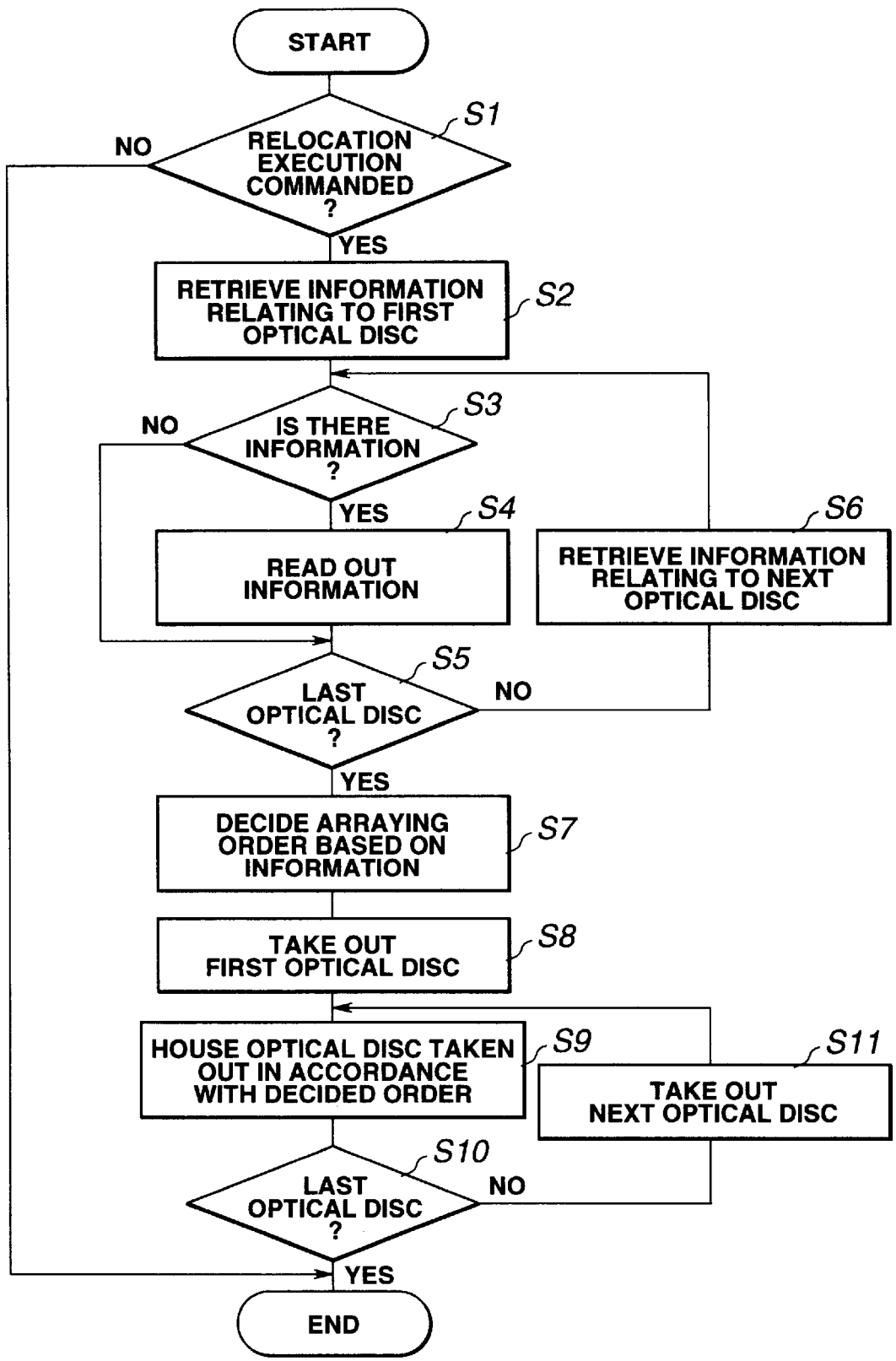
FIG. 2 is a flowchart of a relocation mode in which the disc reproducing apparatus of the first embodiment relocates an optical disc on the basis of optical disc-related information.

The relocation mode of the optical disc 200 which is carried out on the basis of the information related to the optical disc 200, that is, the category information, is executed in accordance with the flowchart as shown in FIG. 2 as the system controller 7 controls the disc carrier mechanism 4. The case where the optical disc 200 is relocated on the basis of the category information will now be described.

In the disc reproducing apparatus 1, at step S1, the system controller 7 discriminates whether or not an execution command of relocation of the optical disc 200 has been given by the user operating an operating switch of the operating section, not shown, of the apparatus 1. If it is confirmed at step S1 that a relocation execution command has been given by the user operating the operating switch, the system controller 7 proceeds to step S2. If a relocation execution command has not been given, the system controller 7 ends the operation without executing the relocation mode.

At step S2, the system controller 7 retrieves the category information of the optical disc 200 stored in the storage area 5a of the RAM 5. Then, at step S3, the system controller 7 discriminates whether or not the category information of the first optical disc 200 housed in the disc housing section 2, that is, the optical disc 200 housed at address 1 in the housing section 2, is stored in the RAM 5. If it is confirmed at step S3 that the category information related to the first optical disc 200 housed in the housing section 2 exists in the information stored in the storage area 5a of the RAM 5, the system controller 7 reads out the category information from the storage area 5a of the RAM 5, at step S4. The system controller 7 reads out the category information from the RAM 5 and writes the category information into the memory area of the controller 7. At step S5, the system controller 7 discriminates whether or not the category information read out from the RAM 5 is the category information of the last optical disc 200 of the plural optical discs 200 housed in the disc housing section 2. Whether or not the category information corresponding to the optical disc 200 exists, that is, the category information is stored in the area 5a of the RAM 5 is discriminated in accordance with whether or not the information is stored at an address corresponding to the address expressing the position of the slot as each housing position in the housing section.

On the other hand, if it cannot be confirmed at step S3 whether or not the category information exists in the storage area 5a of the RAM 5, the system controller 7 discriminates whether or not the optical disc is the last optical disc 200 housed in the disc housing section 2, that is, the optical disc 200 housed at the last address in the disc housing section 2.

If it is confirmed at step S5 that the optical disc is not the last optical disc 200 housed in the housing section 2, the system controller 7 retrieves again the category information related to the optical disc 200 stored in the storage area 5a of the RAM 5, at step S6. Then, at step S3, the system controller 7 discriminates whether or not the category information corresponding to the next optical disc 200 exists in the storage area 5a of the RAM 5.

If it is confirmed at step S3 that the category information corresponding to the next optical disc 200 exists, the system controller 7 reads out the category information from the area 5a of the RAM 5 and writes the category information into the memory area of the controller 7. Then, at step S5, the system controller 7 discriminates whether or not the optical disc is the last optical disc 200 housed in the housing section 2. If it cannot be confirmed at step S3 whether the category information exists or not, the system controller 7 confirms whether or not the optical disc is the last optical disc 200 housed in the housing section 2, at step S5.

The system controller 7 repeats the above-described operation from step S3 to step S6 with respect to the optical discs housed in the disc housing section 2. If the optical disc is the last optical disc housed in the housing section 2 at step S5, the system controller 7 proceeds to step S7.

At step S7, the system controller 7 decides the arraying order of the optical disc 200 by a control section, not shown, in the system controller 7 on the basis of the category information which is read out from the area 5a of the RAM 5 and held in the memory area of the controller 7. For example, the system controller 7 decides the arraying order of the optical disc 200 so that the optical discs 200 having the same category information are adjacently arrayed in the housing section 2. After the decision, the system controller 7 controls the carrier mechanism 4 by the carrier control circuit 6 so as to relocate the optical disc 200 in accordance with the decided order.

At step S8, the system controller 7 takes out the first optical disc 200, such as, the optical disc 200 housed at address 1 in the disc housing section 2, from the disc housing section 2. At step S9, the system controller 7 houses the optical disc 200, thus taken out, at a housing position corresponding to the decided order. In this case, a slot in which no disc is housed, that is, a free area, must exist in the disc housing section 2.

On completion of the operation of step S9, the system controller 7 discriminates whether or not the optical disc 200 relocated at step S9 is the last optical disc 200 housed in the housing section 2, at step S10.

If it is confirmed at step S10 that the optical disc is not the last optical disc 200 housed in the housing section 2, the system controller 7 proceeds to step S11 and takes out the next optical disc 200 from the disc housing section 2 in accordance with the decided order. The system controller 7 relocates the next optical disc 200, thus taken out, into a slot in the housing section 2 which is adjacent to the optical disc 200 relocated at the previous step S9 in accordance with the decided order.

The system controller 7 repeats relocation of the optical discs 200 as described above until it is confirmed at step S10 that the relocated optical disc 200 is the last optical disc 200 housed in the disc housing section 2.

In the disc reproducing apparatus 1, the housing positions of the optical discs 200 are exchanged by carrying out relocation of the optical discs 200 in the housing section using the carrier mechanism 4 on the basis of the information related to the optical disc 200, such as, the category information.

Therefore, in the disc reproducing apparatus 1, the optical discs of the same category may be arrayed or housed at adjacent housing positions in the disc housing section 2 by an execution command of the relocation mode.

Thus, in the disc reproducing apparatus 1, when continuous reproduction is desired for each category after execution of the above-described relocation mode, the disc carrier mechanism 4 can quickly select the desired optical disc 200 and carry the selected optical disc 200 to the reproducing section 3. Thus, the disc reproducing apparatus 1 enables reduction in time for taking out, housing and carrying the optical disc 200 in the case where continuous reproduction based on the category is carried out.

In addition, since the operation of taking out, housing and carrying the optical disc 200 by the disc carrier mechanism 4 may be minimized, the disc reproducing apparatus 1 enables reduction in power consumption at the time of continuous reproduction. By minimizing the operation of taking out, housing and carrying the optical disc 200 by the carrier mechanism, the driving noise of the disc carrier mechanism 4 due to the operation of carrying the optical disc 200 may be reduced.

Since the optical discs 200 are housed by each category in the disc reproducing apparatus 1, the user may easily manage the optical discs 200. Therefore, the user need not carry out any troublesome operation to find the housing position for each category.

In the disc reproducing apparatus 1, the above-described relocation of the operation discs may be carried out at a predetermined time or at a non-use time, by using a timer. For example, by executing the relocation mode of the optical disc during a time period when the disc reproducing apparatus 1 is not operated, such as, at night, the relocation of the optical discs 200 by category, for example, by genre, is completed by the following morning. Thus, the use efficiency of the disc reproducing apparatus 1 is improved.

A disc reproducing apparatus according to a second embodiment will now be described.

The disc reproducing apparatus 1 of the second embodiment has a structure similar to that of the apparatus shown in FIG. 1. Therefore, the detailed description with reference to FIG. 1 is employed for the second embodiment, and its structure will not be described further in detail.

In the disc reproducing apparatus 1 of the second embodiment, on completion of reproduction, the optical disc 200 completed in reproduction based on the information related to the optical disc 200, such as, the category information including the genre or the name of the singer, is housed in a slot in which no optical disc 200 is housed, that is, in a free area, in a housing area of the housing section 2 where the optical discs 200 having the same category information as the above-mentioned information are housed.

In the disc reproducing apparatus 1, it is confirmed whether or not the information related to the optical disc 200 reproduced by the reproducing section 3 is stored in the disc input information storage area 5a of the RAM 5. After the information is confirmed, it is confirmed whether or not a free housing position, that is, a free slot, in which no optical disc 200 is housed exists in the housing area of the disc housing section 2 where the optical discs 200 having the same category information as the disc completed in reproduction are housed. If there is any free slot as a free housing position, the optical disc 200 completed in reproduction is housed in that free slot. The confirmation of the free housing position is carried out on the basis of the information stored in the housing position storage area 5b of the RAM 5.

Figure 3:
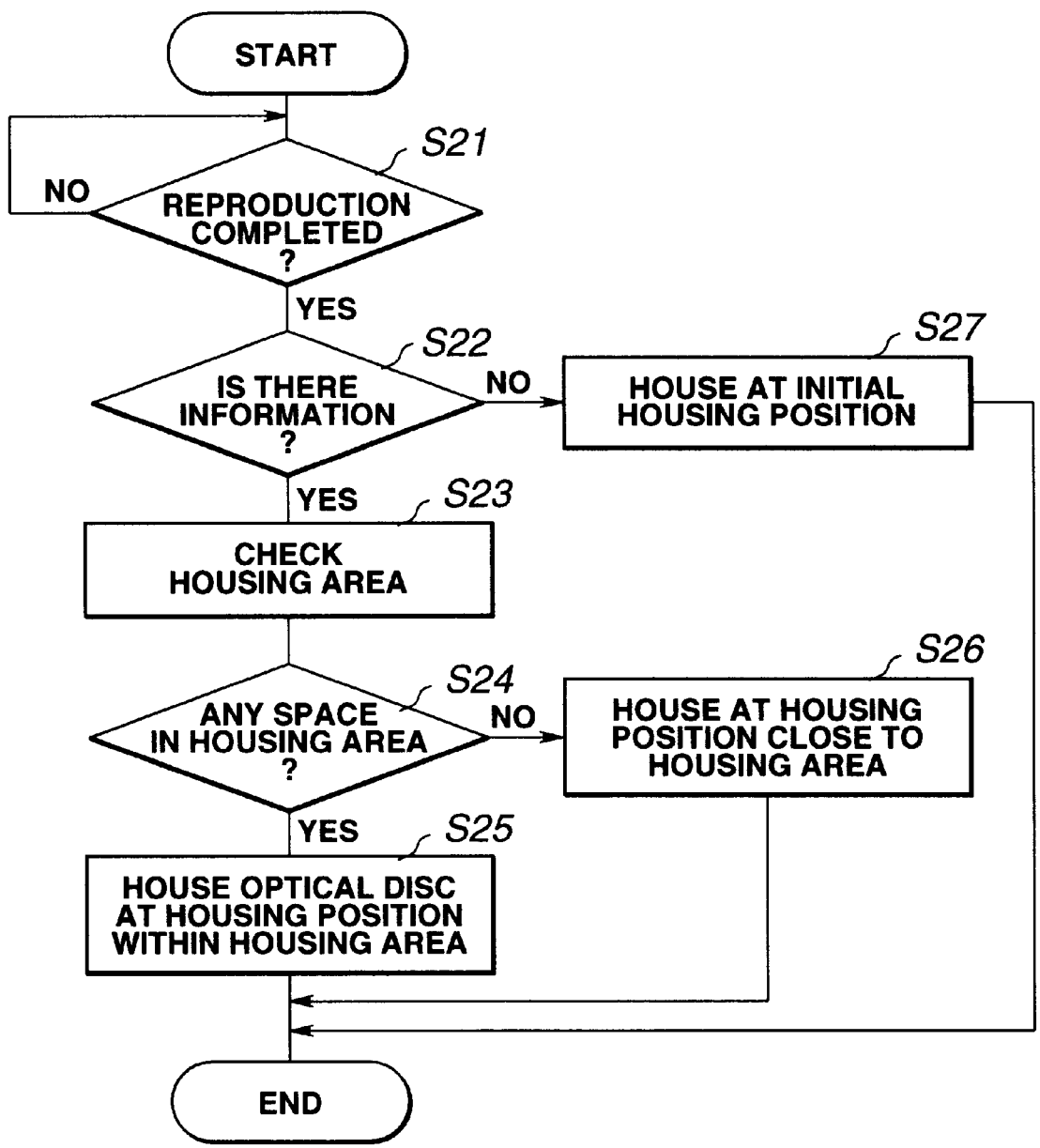
FIG. 3 is a flowchart of a housing mode in which the disc reproducing apparatus of the second embodiment houses an optical disc on the basis of optical disc-related information on completion of reproduction of the optical disc.

The housing mode immediately after completion of reproduction of the optical disc 200 based on the information related to the optical disc 200 is executed in accordance with a flowchart as shown in FIG. 3 as the system controller 7 controls the disc carrier mechanism 4. For example, the case where the optical disc 200 is housed on the basis of the category information will now be described.

In the disc reproducing apparatus 1, at step S21, the system controller 7 discriminates whether reproduction of the optical disc 200 is completed or not. If it is confirmed that reproduction is completed, the system controller 7 proceeds to step S22. If reproduction is not completed at step S21, the system controller 7 is in a standby state until completion of reproduction. The discrimination on whether reproduction of the optical disc 200 by the reproducing section 3 is completed or not is carried out by discriminating whether or not a time code or address information read out from the optical disc together with music information on the basis of table of contents information recorded on the optical disc 200 has reached the last time code or the last address recorded on the optical disc.

At step S22, the system controller 7 discriminates presence/absence of the category information corresponding to the optical disc 200 completed in reproduction. The confirmation of presence/absence of the category information is carried out in accordance with whether or not the category information of the optical disc 200 is stored in the disc input information storage area 5a of the RAM 5, as in the first embodiment.

If it is confirmed that the category information corresponding to the optical disc 200 completed in reproduction exists in the area 5a of the RAM 5, the system controller 7 retrieves, at step S23, a free housing position in the area in the housing section 2 where the optical discs having the same category information as the optical disc 200 completed in reproduction are housed, on the basis of the information of the area 5a of the RAM 5. Then, at step S24, the system controller 7 discriminates presence/absence of a free housing position in the corresponding housing area. The presence/absence of a free housing position in the housing area is discriminated by retrieving whether or not data indicating that an optical disc is not housed, or a position or slot where a flag indicating that an optical disc is housed is not raised, exists in the housing position storage area 5b of the RAM 5 by the detection mechanism, not shown.

If it is confirmed that a free housing position exists in the retrieved housing area, the system controller 7 houses the optical disc 200 taken out of the reproducing section 3 at the housing position in the housing section 2 by the carrier mechanism 4, at step S25.

If it is confirmed at step S24 that no free housing position exists in the area where the optical discs having the same category information as the optical disc 200 completed in reproduction are housed, the system controller 7 houses the optical disc 200 completed in reproduction at a free housing position near the area, as step S26, and ends the operation.

Meanwhile, if it cannot be confirmed at step S22 whether or not the category information corresponding to the optical disc 200 completed in reproduction exists in the disc input information storage area 5a of the RAM 5, the system controller 7 houses the optical disc 200 completed in reproduction at the initial housing position in the housing section 2 where the optical disc completed in reproduction was originally housed, at step S27. Similarly, if there is no slot as a free housing position in the housing section 2, that is, if the optical discs 200 are fully housed in the housing section 2, the optical disc completed in reproduction is returned to and housed at the original housing position in the housing section 2 from where this optical disc was taken out.

As described above, in the disc reproducing apparatus 1 of the second embodiment, the optical disc 200 completed in reproduction is housed in the disc housing section 2 in accordance with the housing mode based on the information related to the optical disc 200, that is, the category information.

Thus, in the disc reproducing apparatus 1 of the second embodiment, the optical disc 200 completed in reproduction may be housed and arrayed adjacently to the plural optical discs 200 having the same category information.

Therefore, in the disc reproducing apparatus 1 of the second embodiment, when a disc pertaining to a certain category is continuously reproduced after the optical disc completed in reproduction is housed in accordance with the flowchart of FIG. 3, the disc carrier mechanism 4 can quickly take out a desired optical disc 200 from the housing section 2 and carry the desired optical disc 200 to the reproducing section 3. Thus, the disc reproducing apparatus 1 enables reduction in time for taking out, housing and carrying the optical disc 200 in the case where continuous reproduction based on the category is carried out.

In addition, since the operation of taking out, housing and carrying the optical disc 200 by the disc carrier mechanism 4 may be minimized, the disc reproducing apparatus 1 of the second embodiment enables reduction in power consumption at the time of continuous reproduction. By minimizing the operation of taking out, housing and carrying the optical disc 200, the driving noise of the disc carrier mechanism 4 due to the operation of carrying the optical disc 200 may be reduced.

Since the plural optical discs 200 are housed by each category in the disc reproducing section 2, the user may easily manage the optical discs 200. Therefore, when housing the optical disc in the housing section 2, the user need not carry out any troublesome operation to find the housing position for each category.

A disc reproducing apparatus according to a third embodiment will now be described.

Figure 4:
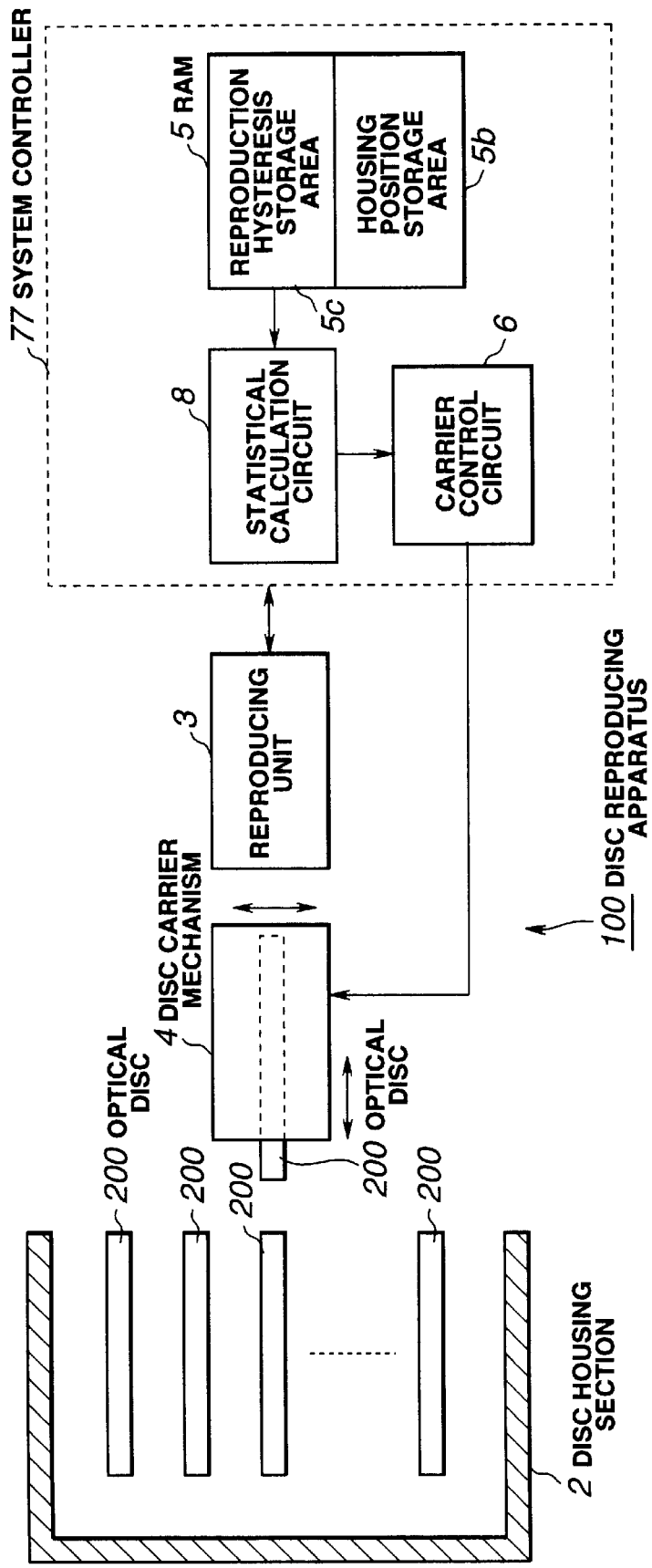
FIG. 4 is a diagram showing the circuit structure of a disc reproducing apparatus as a third embodiment of the present invention.

In the disc reproducing apparatus 100 of the third embodiment, an optical disc 200 is taken out of a disc housing section 2 housing plural optical discs 200, and is then reproduced by a reproducing section 3, as shown in FIG. 4. Relocation information is generated on the basis of reproduction hysteresis information of the optical disc 200 which was reproduced in the past, and on the basis of the relocation information thus generated, the plural optical discs 200 housed in the housing section 2 are relocated. In FIG. 4, portions common to those in FIG. 1 are denoted by the same reference numerals.

The disc reproducing apparatus 100 of the third embodiment has the disc housing section 2 having plural housing positions for housing plural optical discs 200, the reproducing section 3 for reproducing one optical disc 200 taken out of the disc housing section 2, a disc carrier mechanism 4 for carrying the optical disc 200 between the housing position in the disc housing section 2 and the reproducing position in the reproducing section 3, a RAM 5 having a reproduction hysteresis storage area 5c in which reproduction hysteresis information of the optical disc 200 reproduced in the past is stored, a statistical calculation circuit 8 for calculating a weighting factor indicating the relation between the optical discs 200 by statistical application based on the reproduction hysteresis information, and a carrier control circuit 6 for relocating the optical disc 200 on the basis of relocation information obtained from the weighting factor. The reproduction hysteresis information is information including, for example, address information of the housing position in the housing section 2 where the optical disc 200 reproduced by the reproducing section 3 was housed, the date on which the optical disc 200 is reproduced, and the like.

The RAM 5 also has a housing position storage area 5b in which the housing position of the optical disc 200 is stored, as in the above-described first embodiment.

Figure 5:
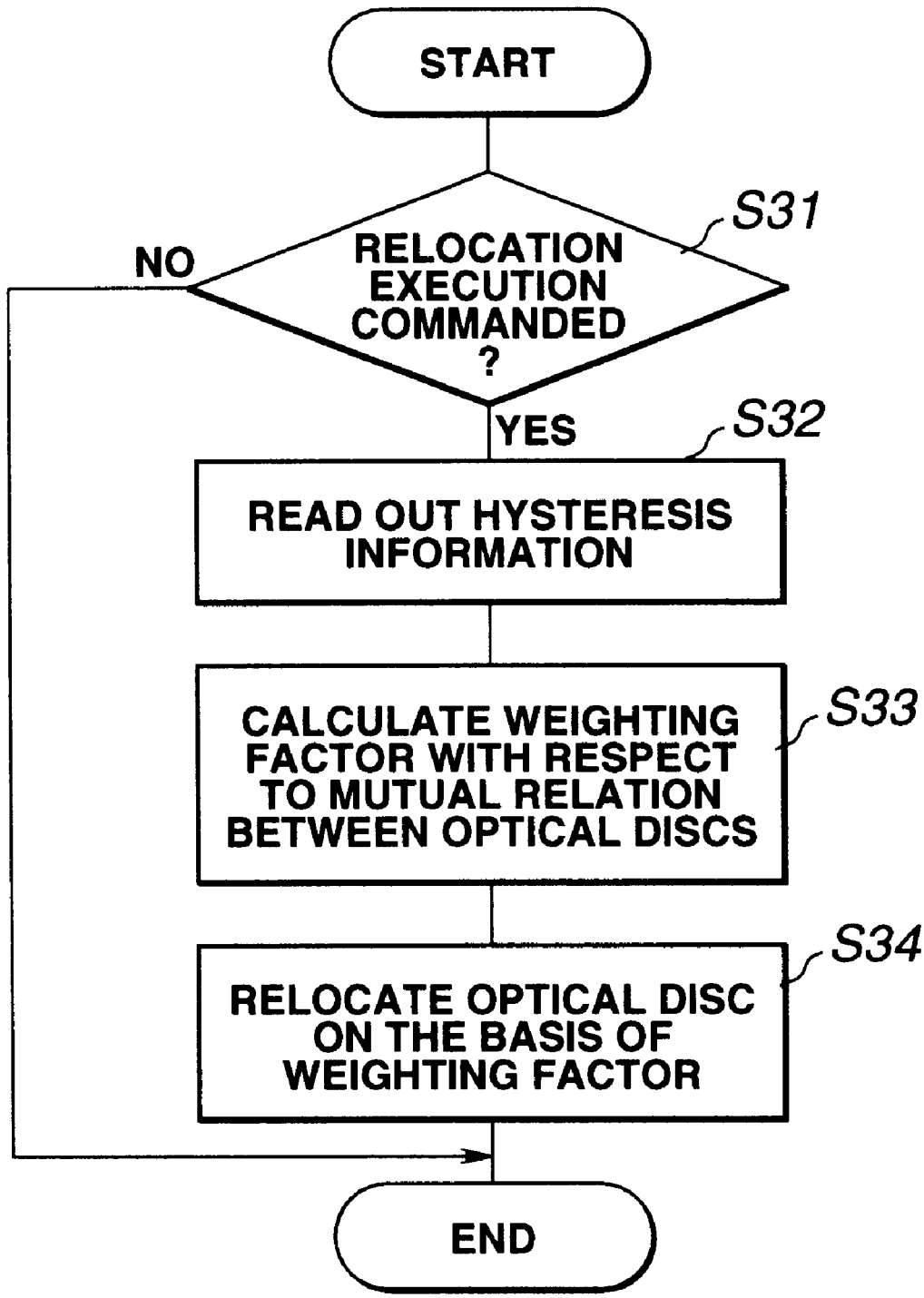
FIG. 5 is a flowchart of a relocation mode in which the disc reproducing apparatus of the third embodiment relocates an optical disc on the basis of reproduction hysteresis information of the optical disc.

The relocation mode of the optical disc 200 carried out on the basis of the reproduction hysteresis information of the optical disc 200 is executed by a system controller 77 in accordance with a flowchart as shown in FIG. 5.

In the disc reproducing apparatus 100, at step S31, the system controller 77 discriminates whether or not an operating switch of an operating section, not shown, of the apparatus 100 has been operated to input a relocation execution command. If it is confirmed that the relocation execution command has been given, the system controller 77 proceeds to step S32. If the relocation execution command has not been given at step S31, the system controller 77 ends the operation without executing the relocation mode.

At step S32, the system controller 77 reads out reproduction hysteresis information related to the optical disc 200 stored in the reproduction hysteresis storage area 5c of the RAM 5. After reading out the reproduction hysteresis information from the area 5c of the RAM 5, the system controller 77 calculates a weighting factor corresponding to the reproduction frequency with respect to the mutual relation between the optical discs 200, at step S33. The calculation of the weighting factor is carried out by the statistical calculation circuit 8 on the basis of the reproduction hysteresis information of the optical disc stored in the reproduction hysteresis storage area 5c. The weighting factor is a value indicating the relation with the other optical discs 200, as described above, and is calculated to be larger with respect to the other optical discs are continuously reproduced at a high frequency.

After calculating the weighting factor, the system controller 77 causes the carrier control circuit 6 to operate the disc carrier mechanism 4 so as to take out the optical disc 200 from the slot of the disc housing section 2 and replace the optical disc 200 with another optical disc, thereby relocating the optical disc 200 in accordance with the relocation information based on the calculated weighting factor, at step S34. Then, the relocation mode ends. By this relocation, the optical discs 200 are housed, for example, from the first housing position in the disc housing section 2 in the order of the largest weighting factor, that is, in the order of the highest frequency of continuous reproduction.

As described above, in the disc reproducing apparatus 100 of the third embodiment, the housing positions of the plural optical discs 200 already housed in the disc housing section 2 are exchanged by the relocation mode based on the reproduction hysteresis information of the optical disc 200, and the optical discs 200 are re-arrayed in the order of the highest reproduction frequency.

Therefore, in the disc reproducing apparatus 100 of the third embodiment, since the optical discs 200 of a high reproduction frequency are housed in the disc housing section 2 after execution of the relocation mode, the disc carrier mechanism 4 can quickly take out a desired optical disc 200 from the disc housing section 2 and carry the desired optical disc 200 to the reproducing section 3.

Since the operation of taking out, housing and carrying the optical disc 200 by the disc carrier mechanism 4 may be minimized, the disc reproducing apparatus 100 enables reduction in power consumption at the time of continuous reproduction. By minimizing the operation of taking out, housing and carrying the optical disc 200, the driving noise of the disc carrier mechanism 4 due to the operation of carrying the optical disc 200 may be reduced.

In the disc reproducing apparatus 100, the relocation mode of the optical disc may be executed at a predetermined time or at a non-use time of the apparatus, and may also be executed periodically and automatically, for example, every week or every month. For example, by executing the relocation mode of the optical disc during a time period when the disc reproducing apparatus 100 is not operated, such as, at night, the re-arraying of the optical discs 200 housed in the disc housing section 2 in the order of the highest reproduction frequency is completed by the following morning. Thus, the use efficiency of the disc reproducing apparatus 100 is improved.

Figure 6:
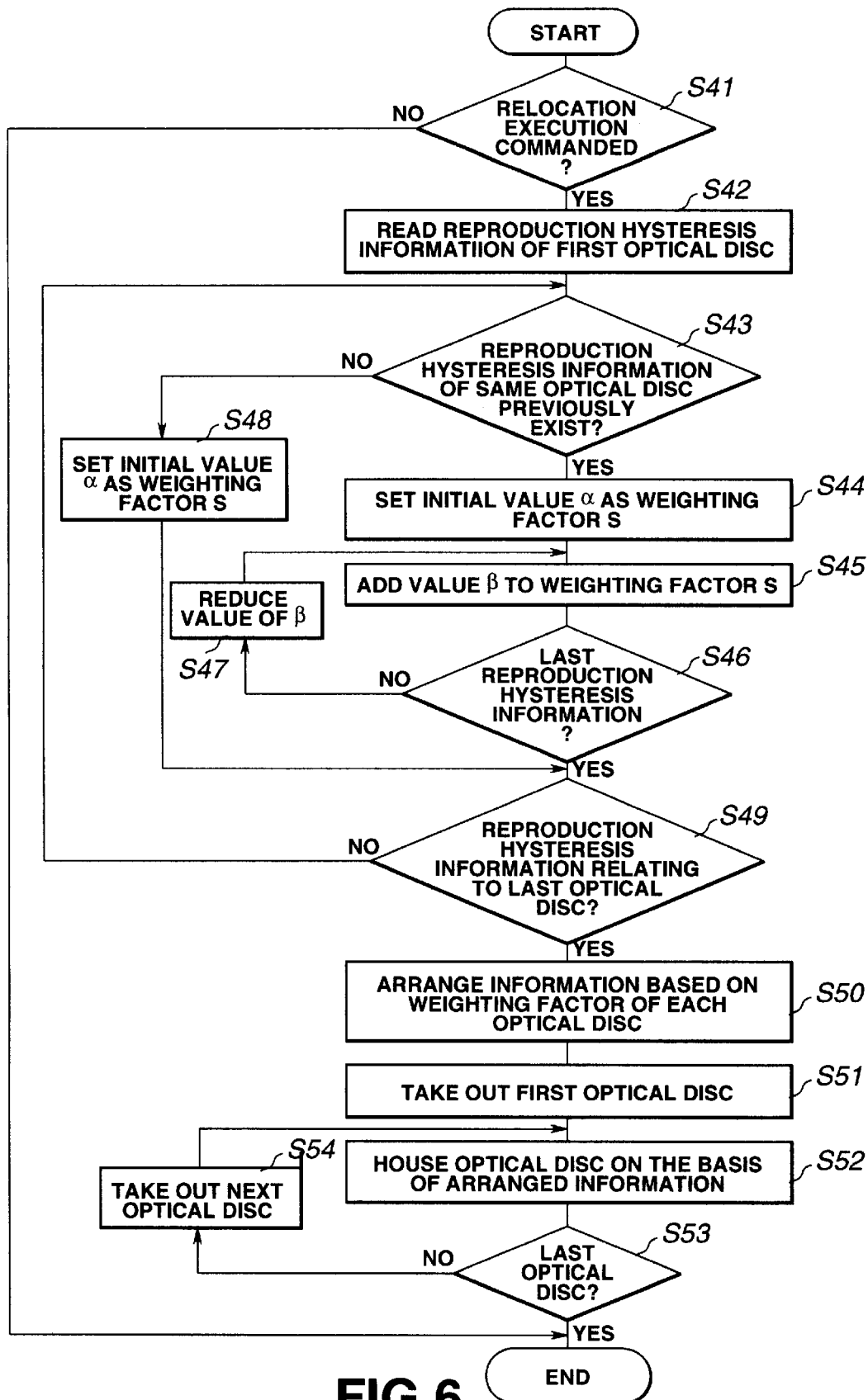
FIG. 6 is a flowchart showing, further in detail, the relocation mode in which the disc reproducing apparatus of the third embodiment relocates an optical disc on the basis of reproduction hysteresis information of the optical disc.

The flowchart of FIG. 5 is illustrated further in detail in FIG. 6. In accordance with this flowchart as shown in FIG. 6, the weighting function based on the reproduction hysteresis information is determined by the statistical calculation circuit 8, and the carrier mechanism 4 is controlled by the carrier control circuit 6 of the system controller 77 so as to execute the relocation mode.

First, at step S41, the system controller 77 discriminates whether or not the operating switch of the operating section, not shown, of the apparatus 100 has been operated to give a relocation execution command. If it is confirmed at step S41 that the relocation execution command has been given, the system controller 77 proceeds to step S42. If the relocation execution command has not been given at step S41, the system controller 77 ends the operation without executing the relocation mode.

At step S42, the system controller 77 reads out reproduction hysteresis information related to the optical disc 200 stored in the reproduction hysteresis storage area 5c of the RAM 5. If the reproduction hysteresis information related to the optical disc 200 to be read out is not stored at all in the reproduction hysteresis storage area 5c of the RAM 5, the system controller 77 reads out the latest reproduction hysteresis information related to the next optical disc 200.

After reading out the latest reproduction hysteresis information from the RAM 5, the system controller 77 discriminates whether or not the read out reproduction hysteresis information of the optical disc 200 previously existed in the area 5c of the RAM 5, at step S43. The previous reproduction hysteresis information is old reproduction hysteresis information which is temporally preceding.

If it is confirmed that the read out reproduction hysteresis information of the optical disc 200 previously existed, the statistical calculation circuit 8 of the system controller 77 gives an initial value $\alpha$ of the weighting factor s, at step S44, and subsequently adds an added value $\beta$ to the weighting factor s, at step S45. For example, the weighting factor s is calculated by adding the added β=0.5 to the initial value α=1.

After calculating the weighting factor s, the system controller 77 discriminates at step S46 whether or not the previous reproduction hysteresis information read out of the area 5c of the RAM 5 is the last reproduction hysteresis information, i.e., the oldest reproduction hysteresis information, that is, whether or not there is no reproduction hysteresis information related to the optical disc 200 which is further temporally preceding the previous reproduction hysteresis information.

If it is discriminated at step S46 that the previous reproduction hysteresis information read out of the RAM 5 is not the last reproduction hysteresis information related to that optical disc stored in the area 5c of the RAM 5, the system controller 77 reduces the added value β, at step S47, and adds the correlation coefficient β again to the weighting factor s, at step S45. At step S47, the correlation coefficient β is reduced from 0.5 to 0.25, for example. Thus, at step S45, the weighting factor s becomes 1.75.

On the other hand, if it is judged at step S46 that the previous reproduction hysteresis information read out of the RAM 5 is the last reproduction hysteresis information related to that optical disc stored in the area 5c of the RAM 5, the system controller 77 proceeds to step S49. If it cannot be confirmed at step S43 whether or not the same reproduction hysteresis information related to the optical disc previously existed in the area 5c of the RAM 5, the initial value α is given as the weighting factor s at step S48, and then the operation proceeds to step S49. In this case, the initial value α is the same value as the initial value given at step S44, for example, "1".

At step S49, the system controller 77 discriminates whether or not the reproduction hysteresis information is reproduction hysteresis information related to the last optical disc 200 housed in the disc housing section 2.

Calculation of the weighting factor of each of optical discs reproduced as shown in Table 1 will now be explained. The calculation of the weighting factor s is carried out with respect to each of optical discs 200 for continuous reproduction within the same day and continuous reproduction within a predetermined period.

TABLE 1

| Reproduction Date | Reproduced Optical Disc | α(Initial Value) | β(Added Value) |
|---|---|---|---|
| February 1 | D1 | 1 for D2 | — |
|  | D2 | 1 for D1 | — |
| January 31 | D2 | 1 for D3, D4 | — |
|  | D3 | 1 for D2, D4 | — |
|  | D4 | 1 for D2, D3 | — |
| January 30 | D3 | 1 for D5 | — |
|  | D5 | 1 for D3 | — |
| January 29 | D1 | — | 1 for D2 |
|  | D2 | — | 1 for D1 |
| January 28 | D1 | 1 for D4 | 0.5 for D2 |
|  | D2 | — | 0.25 for D1 |
|  |  |  | 0.5 for D4 |
|  | D4 | 1 for D1 | 0.5 for D2 |

For example, since an optical disc D1 and an optical disc D2 are reproduced on February 1, an initial value α=1 is first given as the weighting factor s. Since reproduction hysteresis information such that the optical disc D1 and the optical disc D2 were continuously reproduced exists previously, that is, on January 29, an added value β=0.5 is added to calculate the weighting factor s. That is, the weighting factor s becomes 1.5.

Since the reproduction hysteresis information such that the optical disc D1 and the optical disc D2 were continuously reproduced exists further previously, that is, on January 28, the weighting factor s to which a reduced added value β=0.25 is added is calculated. Thus, the weighting factor between the optical disc D1 and the optical disc D2 is calculated to be 1.75 as shown in Table 2.

TABLE 2

|  | Optical Disc | | | | |
|---|---|---|---|---|---|
|  | D1 | D2 | D3 | D4 | D5 |
| Optical Disc |  |  |  |  |  |
| D1 | — | 1.75 | 0 | 1 | 0 |
| D2 | 1.75 | — | 1 | 1.5 | 0 |
| D3 | 0 | 1 | — | 1 | 1 |
| D4 | 1 | 1.5 | 1 | — | 0 |
| D5 | 0 | 0 | 1 | 0 | — |

Similarly, the weighting factors between the respective optical discs D1, D2, D3, D4 and D5 are obtained as shown in Table 2 on the basis of the reproduction hysteresis information of Table 1.

If it is judged at step S49 that the reproduction hysteresis information is the reproduction hysteresis information related to the last optical disc 200 housed in the disc housing section 2, the system controller 77 arranges information on the basis of the weighting factors s with respect to the respective optical discs 200 so as to obtain relocation information, at step S50.

The system controller 77 carries out relocation of the optical discs 200 on the basis of the relocation information generated from the weighting factors obtained as described above. Specifically, the system controller 77 causes the carrier mechanism 4 to take out the first optical disc 200 from the disc housing section 2, at step S51, and then house the optical disc 200 thus taken out into a slot as a housing position in the disc housing section 2 based on the relocation information, at step S52. After housing the optical disc 200, the system controller 77 discriminates whether or not the housed optical disc 200 the last optical disc 200 housed in the disc housing section 2, at step S53. If it is judged at step S53 that the optical disc 200 is the last optical disc housed in the disc housing section 2, the system controller 77 ends the operation.

If it is judged at step S53 that the optical disc 200 is not the last optical disc 200, the system controller 77 takes out the next optical disc 200 from the slot as the housing position in the disc housing section 2 on the basis of the relocation information, at step S54, and then houses the next optical disc 200 at a housing position based on the relocation information, at step S52.

The relocation of the optical disc 200 is repeated until the system controller 77 confirms at step S53 that the optical disc is the last optical disc 200 housed in the disc housing section 2.

A disc reproducing apparatus according to a fourth embodiment will now be described.

Figure 7:
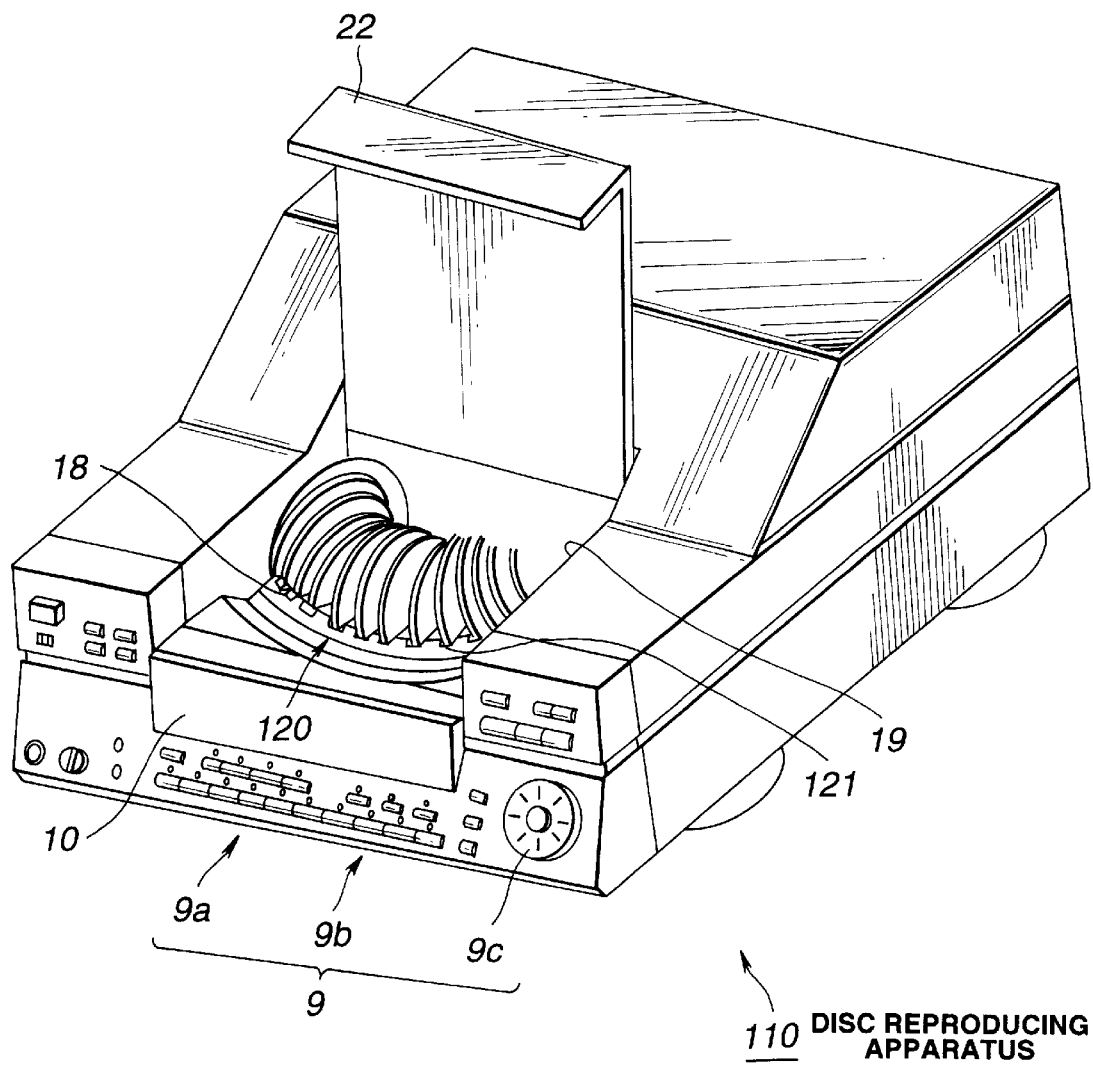
FIG. 7 is a perspective view showing the structure of a disc reproducing apparatus according to a fourth embodiment of the present invention.

A disc reproducing apparatus 110 of the fourth embodiment includes a disc housing section 120 having a rotary table 18 enabling housing of plural optical discs 200, a cover 22 mounted to freely open and close with respect to an outlet/inlet 19 for the optical discs 200, an operating section 9 arranged on the front side of the apparatus body, and a display section 10 constituted by a liquid crystal display or an FL tube, as shown in FIG. 7.

In the disc reproducing apparatus 110, by closing the outlet/inlet 19 with the cover 22 when the optical disc is reproduced or when the apparatus is not used, entry of dust particles into the disc housing section 120 of the apparatus 110 may be prevented.

On the rotary table 18, slits 121 for separately housing the optical discs 200 from each other are formed. The optical discs 200 are housed in the respective slits 121 provided on the rotary table 18. The disc reproducing apparatus 110 manages information related to the optical discs 200 by appending disc numbers to the slits 121. For example, information stored in a housing position storage area 150b and a disc input information storage area 150a of a RAM 150 as later described is managed in accordance with the slits 121.

Figure 8:
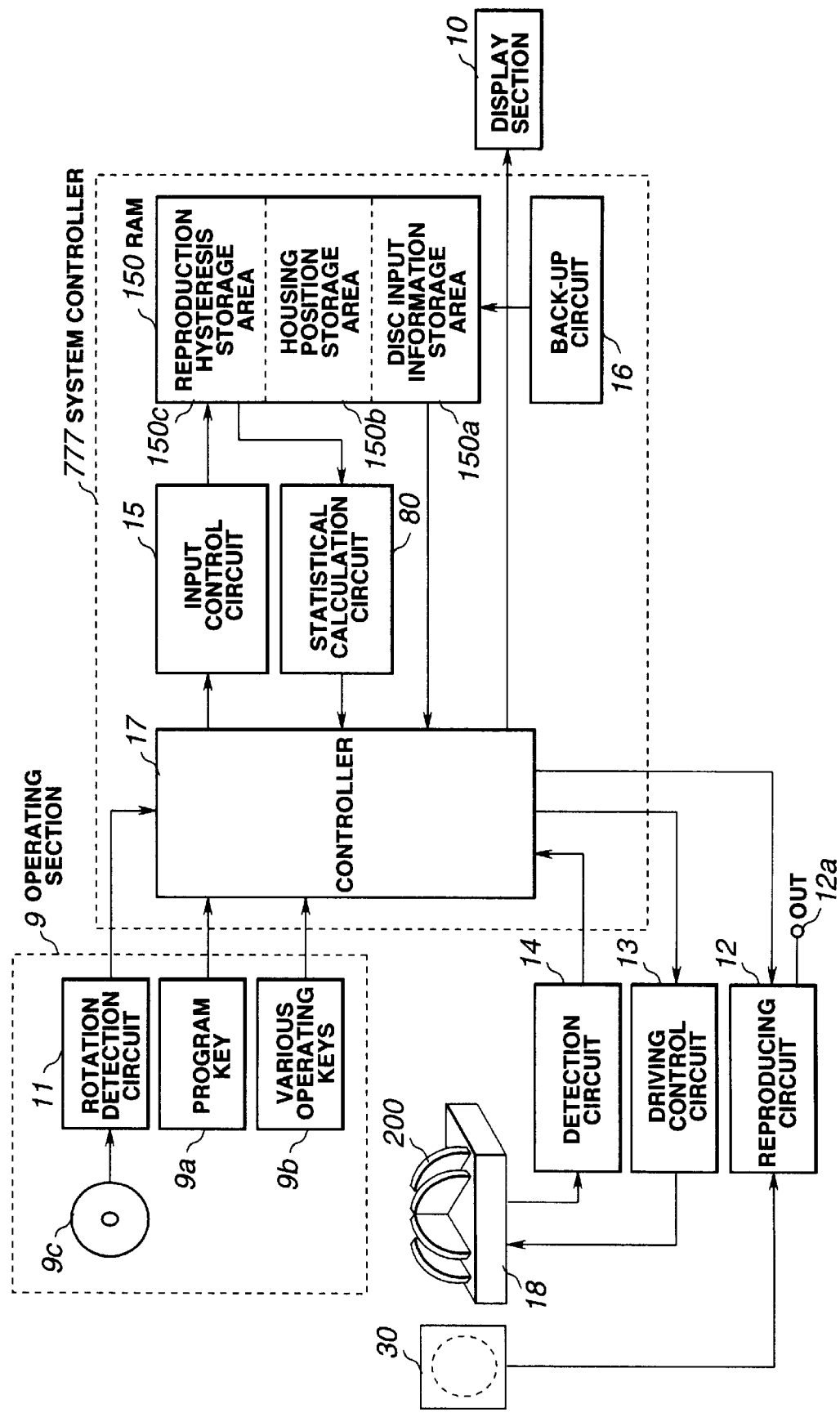
FIG. 8 is a diagram showing the circuit structure of the disc reproducing apparatus of the fourth embodiment.

The operating section 9 includes a program key 9a which enables continuous reproduction of the optical discs 200, various operating keys 9b including a rotational operating key, a reproducing key, a one-track jump key, a pause key and stop key, and a rotational operating key 9c, as shown in FIGS. 7 and 8. A user can carry out continuous reproduction of the plural optical discs 200, for example, by genre or singer by operating the program key 9a.

The rotational operating key 9c has 10 turns of stop points (clicks) for one turn, and data is updated by every click. The direction and quantity of rotation of the rotational operating key 9c are detected by a key rotation detection circuit 11.

On the display section 10, the operating state of each key, the disc number of an optical disc which is currently reproduced or selected, or the title name read out from the optical disc or the area 150a of the RAM 150 is displayed.

As shown in FIG. 8, the disc reproducing apparatus 110 includes a reproducing circuit 12 to which information signals recorded on one optical disc 200 of the plural optical discs 200 housed in the disc housing section 120, for example, reproduction signals from a reproducing section 30 reading musical signals, are inputted, a driving control circuit 13 for controlling a disc carrier mechanism, as later described, for carrying the optical disc 200 to the reproducing section 30, and a detection circuit 14 to which detection signals from various sensors are supplied. The disc reproducing apparatus 110 also includes the RAM 150 having a reproduction hysteresis storage area 150c, the housing position storage area 150b and the disc input information storage area 150a, an input control circuit 15 for controlling input of character information and the like from the operating section 9 into the RAM 150, a statistical calculation circuit 80 for calculating a weighting factor indicating the relation with other optical discs 200 on the basis of reproduction hysteresis information stored in the reproduction hysteresis storage area 150c of the RAM 150, a back-up circuit 16 for preventing erasure of the information in the RAM 150 in a state that a power switch provided in the operating section 9 is turned off, and a controller 17 for outputting a driving signal and a control signal to the reproducing circuit 12, the driving control circuit 13 and the input control circuit 15. The statistical calculation circuit 80 is constituted similarly to the statistical calculation circuit 8 of the above-described third embodiment. In the area 150 c of the RAM 150, the disc number appended to the slit 121 in which the optical disc 200 to be reproduced is housed and data related to the date are stored every time the optical disc 200 is reproduced.

The statistical calculation circuit 80, the input control circuit 15, the back-up circuit 16, the controller 17 and the RAM 150 are provided in a system controller 777.

The reproducing circuit 12 performs signal processing of an output signal from the reproducing section 30 and outputs the processed signal from an output terminal 12a. In addition, the reproducing circuit 12 also generates a focusing error signal and a tracking error signal and supplies the control signal to a servo mechanism of the reproducing section 30.

In the reproduction hysteresis storage area 150c of the RAM 150, reproduction hysteresis information of the optical disc 200 which was reproduced in the past is stored, as in the third embodiment. In the housing position storage area 150b, the disc number appended to each slit 121 of the disc housing section 120 is stored. In the disc input information storage area 150a, information inputted by a user with respect to the optical disc 200 housed in each slit of the disc housing section 120, for example, category information like the name of tunes and the genre recorded on the optical disc itself, is stored.

The disc carrier mechanism for carrying a desired optical disc 200 of the optical discs 200 housed in the disc housing section 120, and the reproducing section 30 for reproducing music signals recorded on the optical disc 200 carried by the disc carrier mechanism in the disc reproducing apparatus 110 will now be described.

Figure 9:
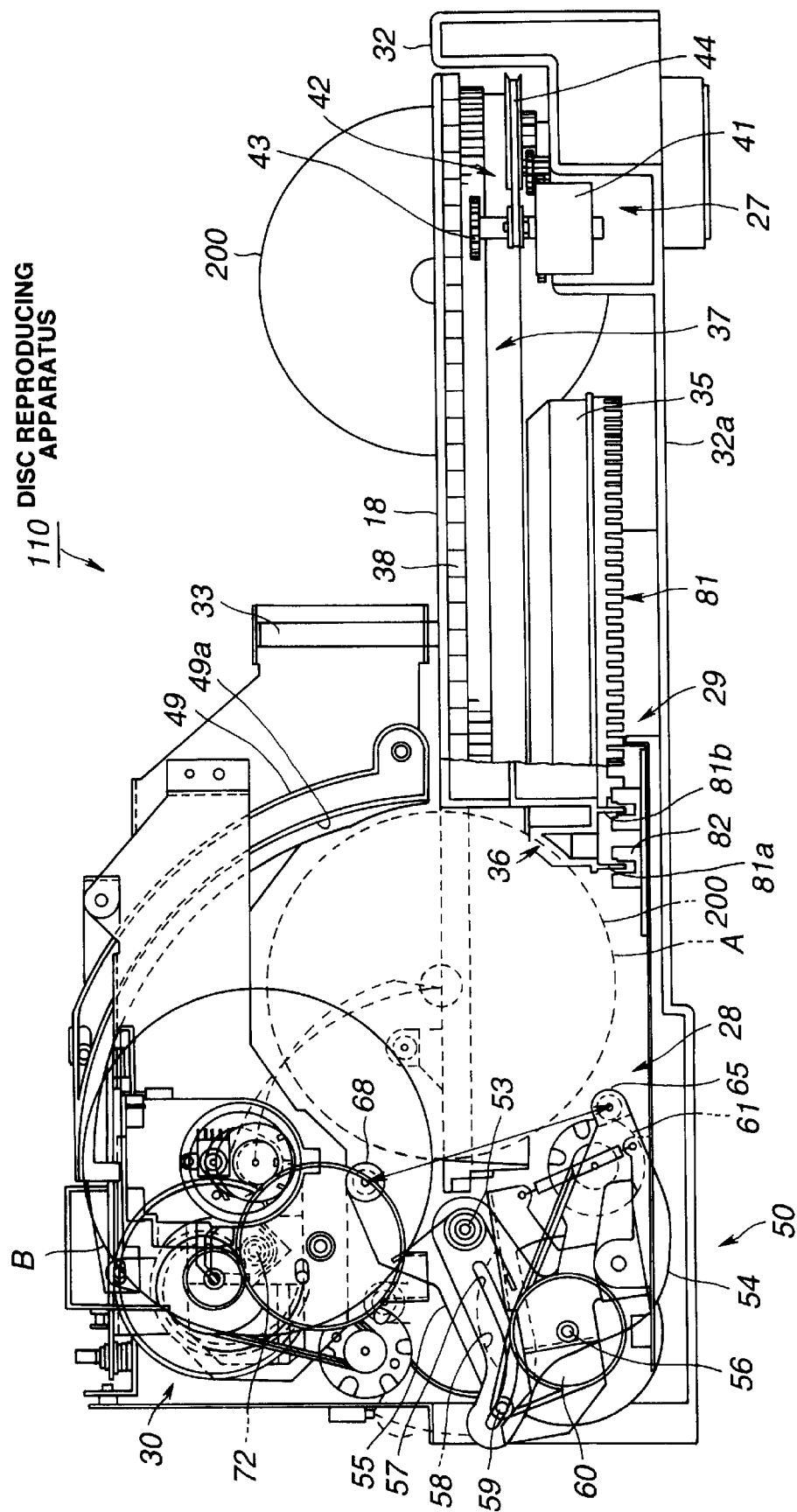
FIG. 9 is a view showing the structure of essential mechanisms (a rotational driving mechanism, a loading mechanism and a rotational position detection mechanism) of the disc reproducing apparatus according to the fourth embodiment.

The disc carrier mechanism includes, as shown in FIG. 9, a rotational carrier mechanism 27 for rotating the rotary table 18 on which the optical discs 200 are housed, a loading mechanism 28 for carrying the desired optical disc 200 which has been carried by the rotation of the rotational carrier mechanism 27 to the reproducing section 30, and a rotational position detection mechanism 29 for suitably operating the rotational carrier mechanism 27.

In the disc reproducing apparatus 110, the rotational carrier mechanism 27 is caused to appropriately rotate the rotary table 18 while the rotation of the rotary table 18 is detected by the rotational position detection mechanism 29, thus loading the desired optical disc 200 of the optical discs 200 housed on the rotary table 18 onto the loading mechanism 28. In the disc reproducing apparatus 110, the optical disc 200 is carried to the reproducing section 30 by the loading mechanism 28.

The rotary table 18 rotated by the rotational carrier mechanism 27 is rotatably housed in the apparatus which is substantially in a box shape. The rotary table 18 is made rotatably clockwise and counterclockwise about a supporting shaft 33 protruding upward from a lower plate 32a of a casing 32, as shown in FIGS. 9 and 10.

Figure 10:
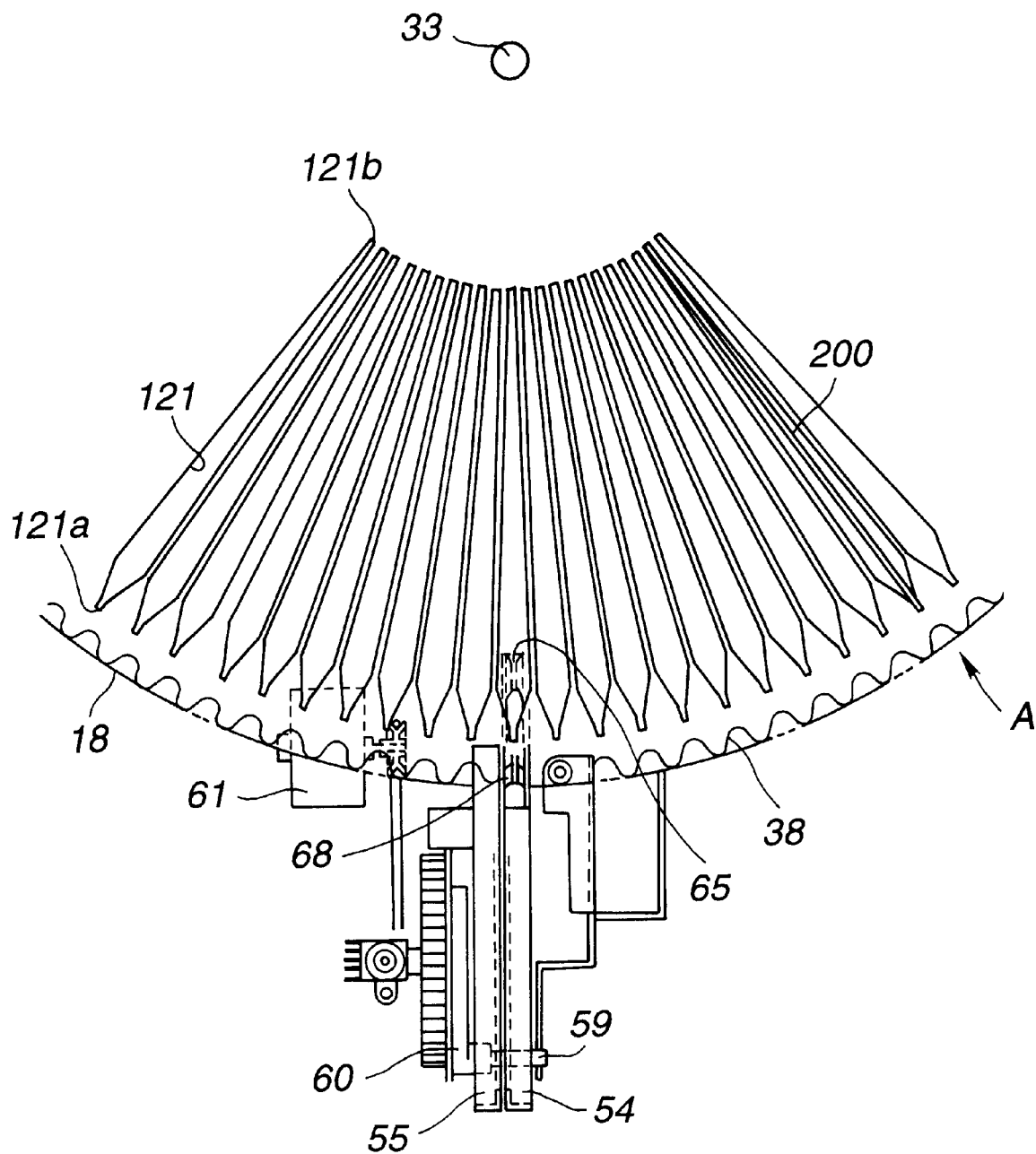
FIG. 10 is a top view showing a part of a rotary table and a part of the loading mechanism of the disc reproducing apparatus according to the fourth embodiment.

On the rotary table 18, 100 slits 121 are radially provided in the direction of radius from the center thereof, as shown in FIG. 10. On the rotary table 18, 100 optical discs 200 are housed in the slits 121 radially from the supporting shaft 33 of the rotary table 18, with each of the optical disc 200 standing vertically.

A cylindrical supporting member 35 is fixed at a concentric position on a lower portion of the rotary table 18, as shown in FIG. 9. On the supporting member 35, a groove 36 along the outer periphery of the optical discs 200 is formed at positions corresponding to the slits 121 so as to prevent the optical discs 200 from falling off when the optical discs 200 are set in the slits 121.

Along the outer periphery of the rotary table 18, a number of gear teeth are formed to constitute a gear section 37. This gear section 37 is meshed with a driving gear 43 of the rotational carrier mechanism 27 so that the rotary table is rotated by the driving gear 43.

On the upper portion of the gear section 37, a number of recessed portions 38 are formed along the outer periphery of the rotary table 18. The recessed portions 38 are provided at positions corresponding to the slits 121. In the example shown in FIG. 9, 100 recessed portions 38 are provided in response to the number of the slits 121.

The rotary table 18 is provided in the casing in such a manner that a part (substantially ¼) of the rotary table 18 is exposed on the front and upper sides through the outlet/inlet 19. Thus, through the outlet/inlet 19, the user can house the optical discs 200 in the part of the rotary table 18, or extract the optical disc 200 already housed in the part of the rotary table. The rotary table 18 is rotated by the rotational carrier mechanism 27.

The rotational carrier mechanism 27 is constituted by a motor 41 installed at a corner within the casing of the apparatus, and a deceleration mechanism 42 having a gear array. The one driving gear 43 constituting the deceleration mechanism 42 and the gear section 37 of the rotary table 18 are constantly meshed with each other.

In the rotational carrier mechanism 27, the rotational force of the motor 41 generated by rotational driving of the motor 41 is transmitted to the deceleration mechanism 42 through a belt 44. The rotational force of the rotation axis of the motor 41 is decelerated by the deceleration mechanism 42, and ultimately transmitted to the gear section 37 of the rotary table 18 through the driving gear 43, thus causing the rotary table 18 to rotate about the supporting shaft 33 as the center.

The loading mechanism 28 is installed at a corner which is within the casing of the apparatus 110 and different from the corner where the rotational carrier mechanism 27 is installed. Fundamentally, the loading mechanism 28 has a guide rail 49 of a curved shape which is provided above the corner to extend obliquely upward from a position on the optical disc 200 located at a loading position A facing the center of the rotary table 18 toward the above-described different corner. The loading mechanism 28 also has a mounting/releasing carrier mechanism 50 which is installed on the lower part of the different corner and adapted for rotationally carrying the optical disc 200 upward, that is, to a mounting position B of the reproducing section 30 in FIG. 9, while supporting, at two points, the outer peripheral surface of the optical disc 200 located at the loading position A.

Figure 11:
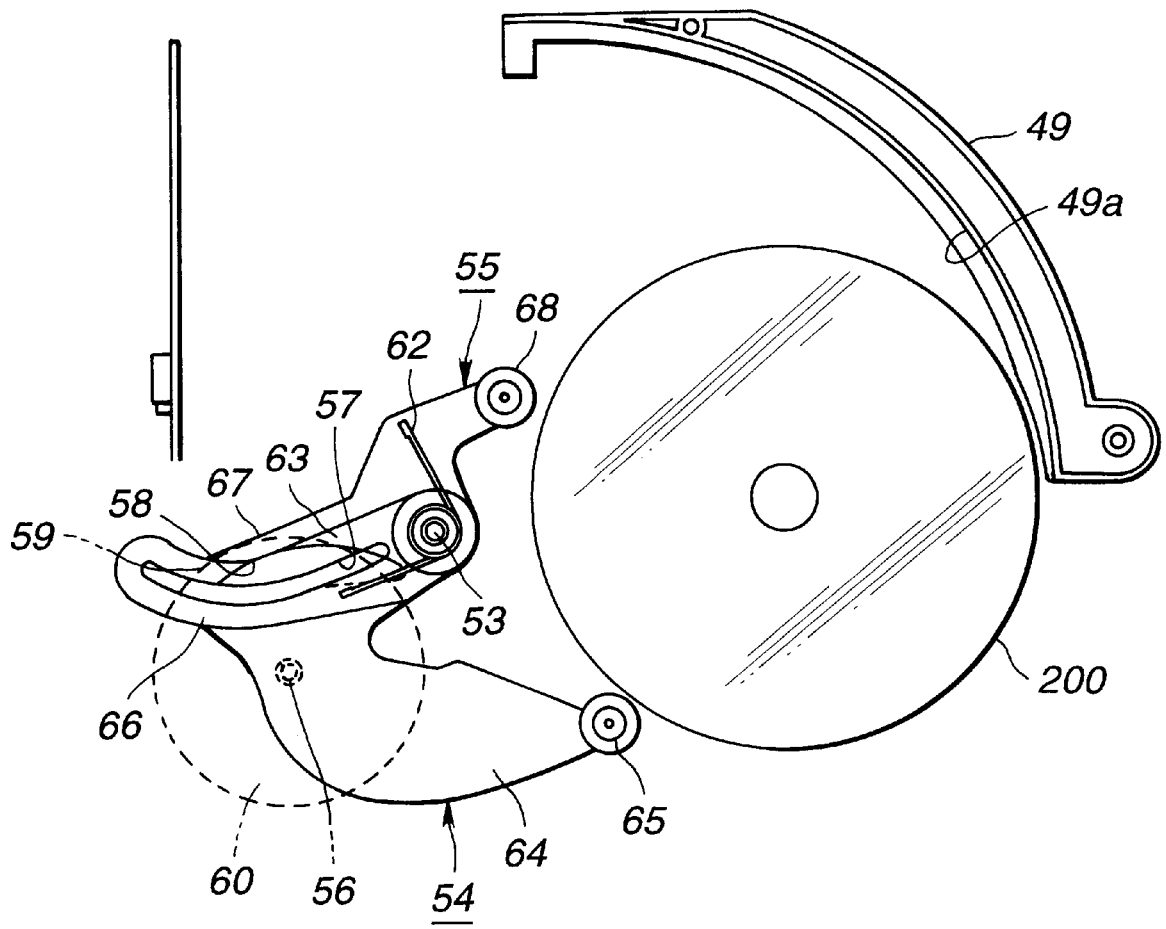
FIG. 11 is a side view showing an initial state of operation of the loading mechanism of the disc reproducing apparatus according to the fourth embodiment.
Figure 12:
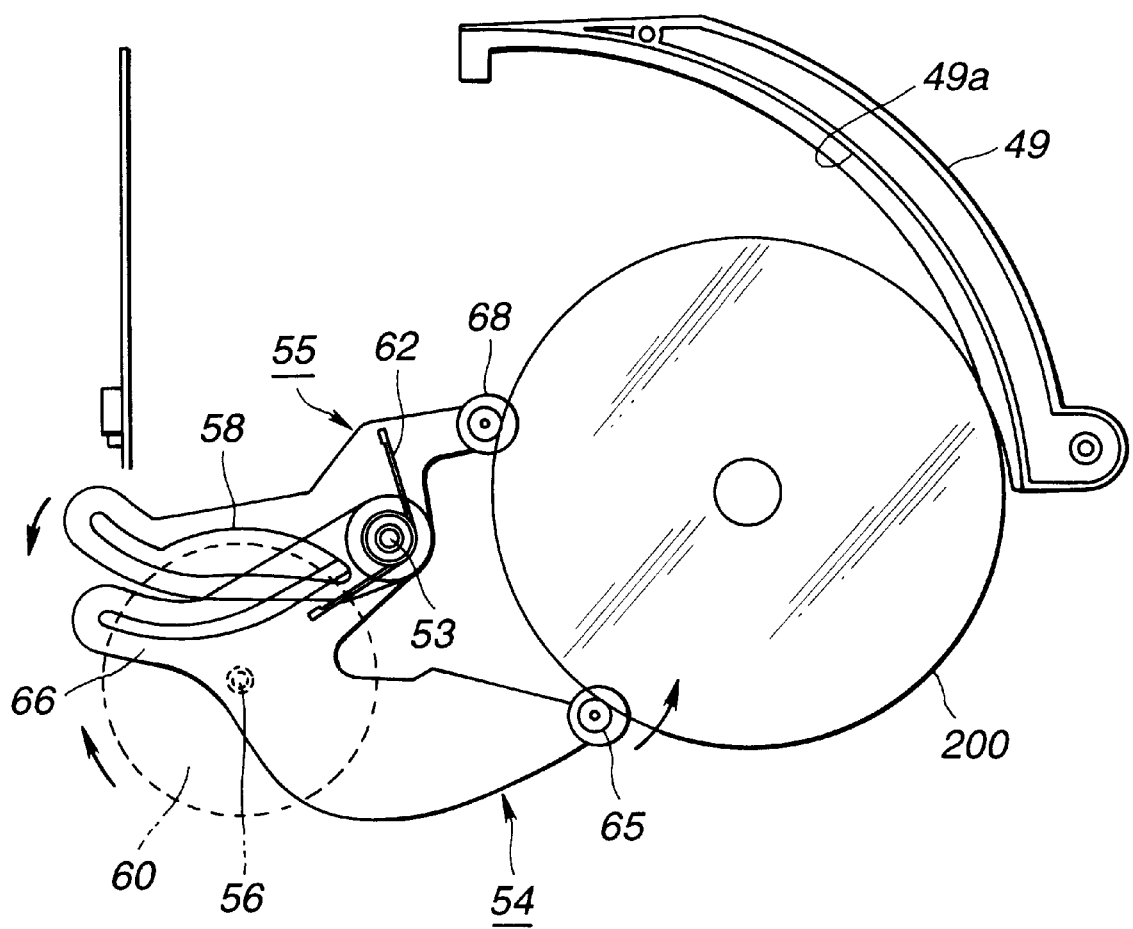
FIG. 12 is a side view showing a state that distal end portions of first and second arms are abutted against an outer peripheral surface of an optical disc at a loading position, in the operation of the loading mechanism of the disc reproducing apparatus according to the fourth embodiment.

The mounting/releasing carrier mechanism 50 has a first arm 54 and a second arm 55 which rotate about a common supporting shaft 53 as the center of rotation, a cam 60 which rotates about a supporting shaft 56 different from the supporting shaft 53 and on which a pin 59 to be inserted into a cam groove 57 and a cam groove 58 formed in the first arm 54 and the second arm 55 is provided upright at an eccentric position of the supporting shaft 56, and a torsion spring 62 mounted on the portion of the supporting shaft 53, FIGS. 11 and 12. The cam 60 is rotationally driven by a motor 61 which is installed at a position obliquely below the loading position A shown in FIG. 9. The torsion spring 62 is mounted on the portion of the supporting shaft 53 in such a manner as to energize distal end portions (where a roller is provided as described later) of the first arm 54 and the second arm 55 into a closing direction.

The first arm 54 includes a driving piece 63 and an operating piece 64 which are unified by a synthetic resin at the upper part of the first arm 54, as shown in FIG. 11. The driving piece 63 extends in a curved flat V-shape toward the rotary table and toward the corner of the casing 32. The operating piece 64 extends in a substantially L-shape toward the rotary table from the center on the lower part of the driving piece 63.

The cam groove 57 is formed in a curved flat V-shape along the curve of the driving piece 63, at a substantially center portion of the driving piece 63 of the first arm 54. The common supporting shaft 53 as the center of rotation is inserted in a right end portion of the driving piece 63.

At the distal end portion of the operating piece 64, a roller 65 rotatably supported to the operating piece 64 is mounted.

When the first arm 54 rotates counterclockwise about the supporting shaft 53 as the center, the bottom of the roller 65 is abutted against the outer peripheral surface of the optical disc 200, as shown in the operation from FIG. 11 to FIG. 12. As the first arm 54 rotates further, the optical disc 200 is raised obliquely upward so as to be in contact with a curved surface 49a of the guide rail 49. As the first arm 54 rotates further, the optical disc 200 is rotationally carried upward along the curved surface 49a of the guide rail 49.

On the other hand, the second arm 55 includes a driving piece 66 and a detection piece 67 which are unified by a synthetic resin at the lower part of the second arm 55. The driving piece 64 extends in a curved flat V-shape toward the rotary table and toward the corner of the casing 32. The detection piece 67 extends in a substantially L-shape upward from one side (the side of the rotary table) of the upper part of the driving piece 66.

The cam groove 58 is formed in a substantially center portion of the driving piece 66 of the second arm. In the example as shown in the drawing, the cam groove 58 has the same shape as the cam groove 57 of the first arm 54, up to a portion of ⅓ of the full length from the left end.

At an end portion, on the side of the rotary table, of the driving piece 66 of the second arm 55, the common supporting shaft 53 as the center of rotation is inserted. At the distal end portion of the detection piece 67, a roller 68 rotatably supported to the detection piece 67 is mounted.

When the second arm 55 rotated clockwise about the supporting shaft 53 as the center, the bottom of the roller 68 is abutted against the outer peripheral surface of the optical disc 200, and further rotation of the second arm 55 is prevented.

The operation of the loading mechanism 28 will now be described.

When the cam 60 rotates clockwise about the supporting shaft 56 as the center from the normal state shown in FIG. 11, the first arm 54 and the second arm 55 rotate about the common supporting shaft 53 as the center so that the roller 65 and the roller 68 provided on the distal ends of the first and second arms, respectively, are abutted against the outer peripheral surface of the optical disc 200 located the loading position A, as shown in FIG. 12.

As the cam 60 further rotates clockwise, the distal end portion 65 of the first arm 54 pushes up the optical disc 200 toward the curved surface 49a of the guide rail 49. At this point, the second arm 55 rotates counterclockwise about the common supporting shaft 53 along with the obliquely upward movement of the optical disc 200.

Figure 13:
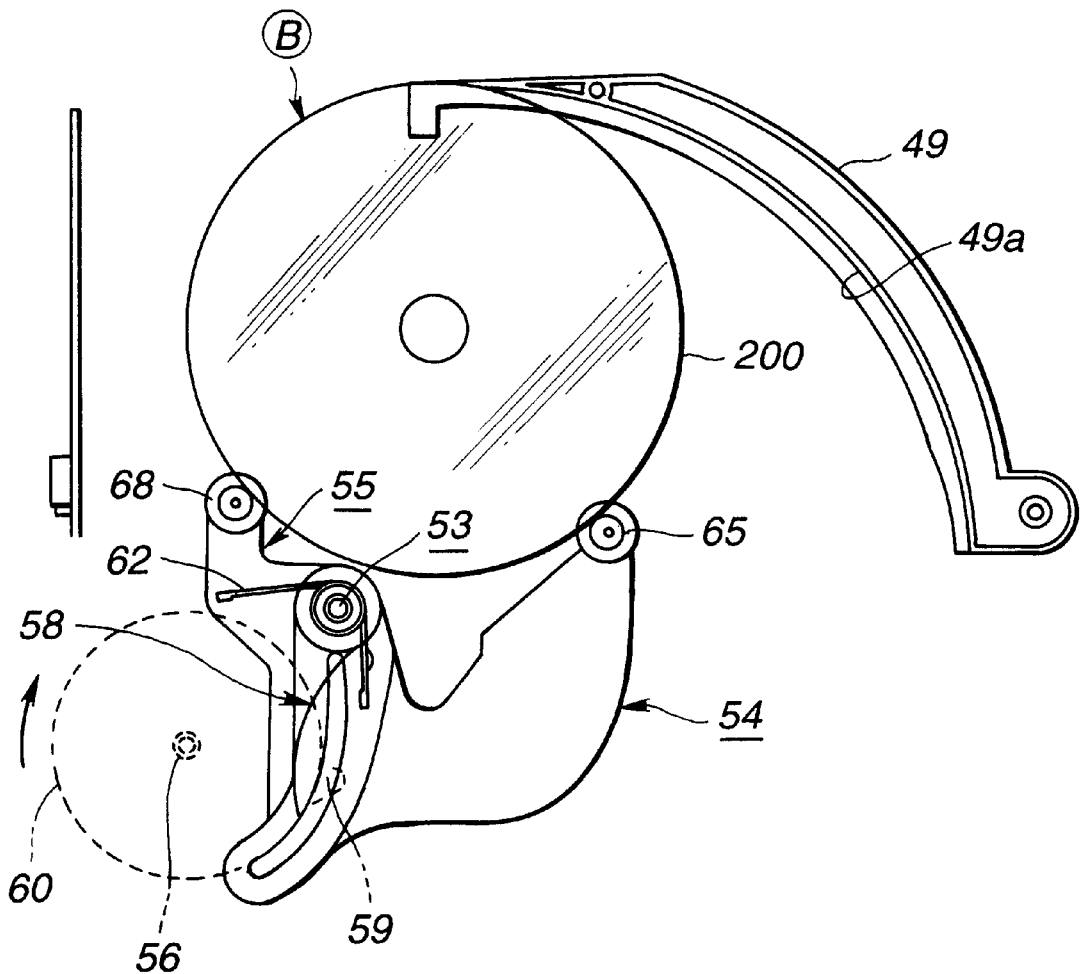
FIG. 13 is a side view showing a state that an optical disc has been carried to a loading position of a reproducing section by the loading mechanism of the disc reproducing apparatus of the fourth embodiment.

As the cam 60 further rotates clockwise, the optical disc 200 is rotationally carried smoothly along the curved surface 49a of the guide rail 49, as shown in FIG. 13.

In the disc reproducing apparatus 110, the desired optical disc 200 is carried to the reproducing section 30 by the loading mechanism 28 of the structure as described above.

Figure 14:
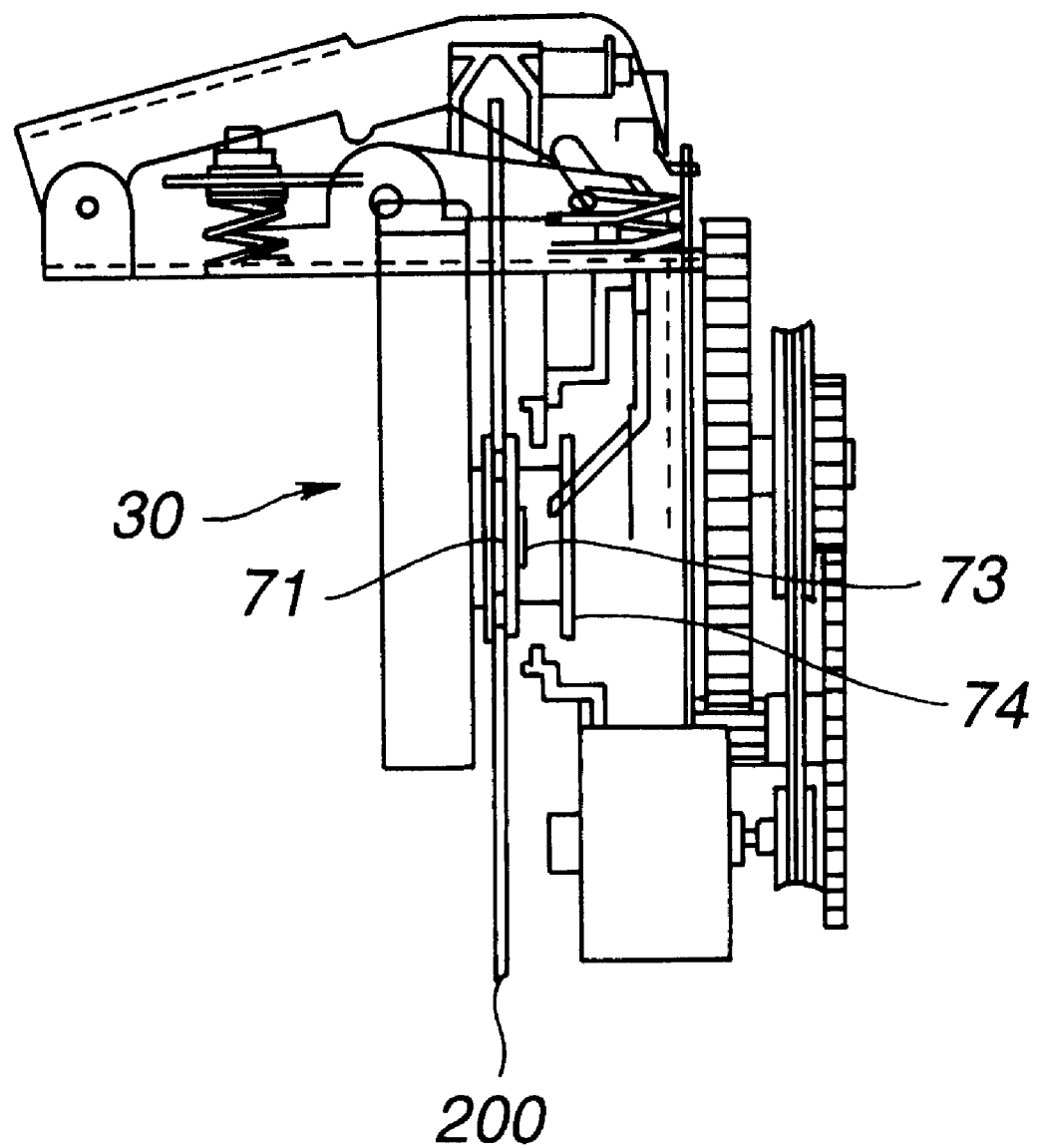
FIG. 14 is a front view showing essential mechanisms (the reproducing section, a chucking mechanism and lock means) in a state that an optical disc is clamped to the reproducing section in the disc reproducing apparatus of the fourth embodiment, viewed from a corner portion of the casing of the apparatus.

The reproducing section 30 has a turn table 71 rotated by a spindle motor, not shown, and an optical pick-up 72 for radiating a laser beam to the signal recording surface of the optical disc 200 provided on the turn table 71, as shown in FIGS. 9 and 14.

The turn table 71 has, at its center portion, an insertion portion 73 made of a metal which is inserted in and engaged with the center hole of the optical disc 200 shifted to the mounting position B in FIG. 9. The reproducing section 30 also has a chucking member 74. The chucking member 74 is provided with a magnet, which attracts the turn table 71.

In the reproducing section 30, the insertion portion 73 of the turn table 71 in the spindle motor is inserted in the center hole of the optical disc 200 located at the mounting position B, and the magnet of the chucking member 74 and the insertion portion 73 are magnetically attracted to each other, thus holding the optical disc 200 between them. In the reproducing section 30, the optical disc 200 is in a vertically clamped state.

In this clamped state, the optical disc 200 is separated away from the distal end portions (the roller 65 and the roller 68) of the first arm 54 and the second arm 55 of the loading mechanism 28.

At the time of reproduction, in the disc reproducing apparatus 110, a driving current is supplied to the spindle motor of the reproducing section 30 to rotationally drive the optical disc 200 in one direction. In this state, by moving the optical pick-up 72 in the direction of radius of the optical disc 200, information signals recorded on the optical disc 200 are read out.

When the optical disc 200 is to be returned to the initial housing position on completion of reproduction of information signals from the optical disc 200, in the disc reproducing apparatus 110, the outer peripheral portion of the optical disc 200 located the mounting position B in FIG. 9 or FIG. 13 is supported again at two points by the distal end portions (the roller 65 and the roller 68) of the first arm 54 and the second arm 55 of the mounting/releasing carrier mechanism 50 of the loading mechanism 28, and the cam 60 is rotated in the reverse direction (counterclockwise in FIG. 13) by the motor 61. Thus, in the disc reproducing apparatus 110, the optical disc 200 may be returned to the initial position (in the slit 121 at the loading position A) while the outer peripheral portion of the optical disc 200 is supported at two points by the distal end portions 65 and 68 of the first arm 54 and the second arm 55.

The rotational position detection mechanism 29 will now be described.

The rotational position detection mechanism 29 includes a rotary detector 81 fixed on the lower surface of the cylindrical supporting member 35 provided below the rotary table 18, and a photodetector 82 installed corresponding to the loading position A, as shown in FIG. 9.

The rotary detector 81 has ring-shaped first detection plate 81a and second detection plate 81b which are located at concentric positions of different diameters of the supporting member 35. The first detection plate 81a has a greater diameter than the second detection plate 81b, and has recesses and protrusions formed on the lower end surface thereof at a predetermined pitch in the circumferential direction. That is, the recesses and protrusions are formed at a pitch corresponding to the 100 slits 121 formed on the rotary table 18. On the other hand, the second detection plate 81b is located on the inner side from the first detection plate 81a, and has recesses and protrusions formed on the lower surface thereof at different pitches in the circumferential direction.

The photodetector 82 includes three photosensors (first, second and third sensors). Each of the photosensors is made of a set of light-emitting element and light-receiving element. The first and second photosensors are installed at a predetermined spacing with respect to the first detection plate 81a, and the third photosensor is installed with respect to the second detection plate 81b. These photosensors output detection signals of a high level when detecting the protrusion of the corresponding first detection plate 81a and second detection plate 81b.

Figure 15:
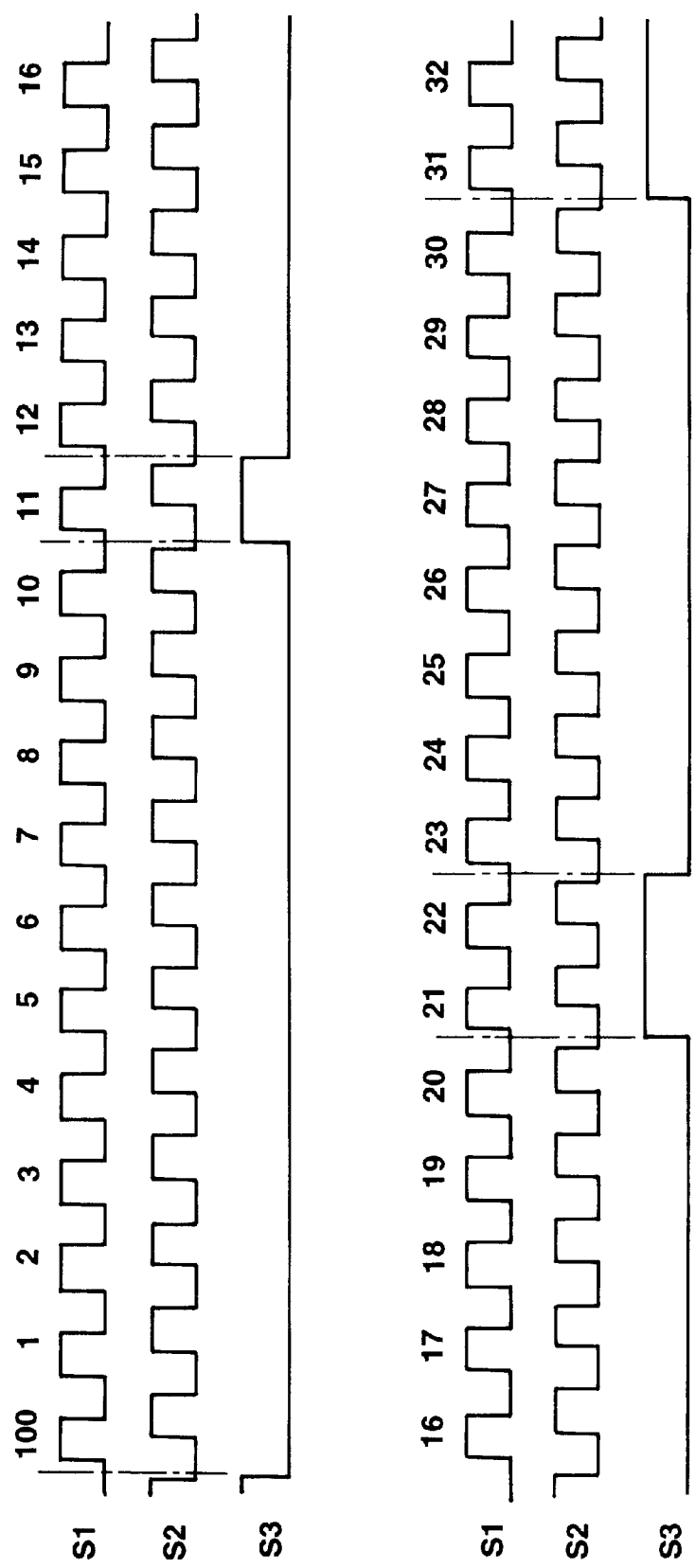
FIG. 15 is a view showing the signal waveform of a detection signal outputted from each photosensor in the rotational position detection mechanism of the disc reproducing apparatus according to the fourth embodiment, and particularly, the signal waveform of each detection signal from the disc number "1" to the disc number "32".

For example, with respect to the disc numbers "1" to "32" allocated to the slits 121 of the rotary table 18, the first photosensor and the second photosensor of the photodetector 82 detect the first detection plate 81a so as to output signal waveforms S1, S2 as the result of detection, and the third photosensor detects the second detection plate 81b so as to output a signal waveform S3 as the result of detection, as shown in FIG. 15.

In the disc reproducing apparatus 110, the controller 777 suitably controls rotation of the rotational carrier mechanism 27 on the basis of the result of detection by the detection circuit 14 to which the detection outputs from the photosensors of the photodetector 82 are supplied.

Thus, in the disc reproducing apparatus 110, when a desired optical disc 200 is to be carried to the reproducing section 30, the rotary table 18 is rotated by the rotational carrier mechanism 27 while rotation of the rotary table 18 is detected by the rotational position detection mechanism 29. In the disc reproducing apparatus 110, when the desired optical disc 200 housed on the rotary table 18 reaches the loading position A, rotation of the rotary table 18 is stopped, and the optical disc 200 located at the loading position A is carried to the reproducing section 30 by the loading mechanism 28.

The constituent parts of the disc reproducing apparatus 110 are thus described above.

In the disc reproducing apparatus 110, when the optical disc 200 housed in the disc housing section 120 is to be reproduced on the basis of input from the operating section 9, the controller 777 first actuates the rotational carrier mechanism 27 through the driving control circuit 13. That is, the rotary table 18 is rotated.

In the disc reproducing apparatus 110, the rotary table 18 is rotated until the desired optical disc 200 designated on the basis of the input from the operating section 9 reaches the loading position A, while the direction and quantity of rotation of the rotary table 18 is detected by the detection circuit 14.

When it is detected by the detection circuit 14 on the basis of the detection output from the photodetector 82 that the optical disc designated on the basis of the input from the operating section 9 has reached the loading position A, the system controller 777 stops rotation of the rotary table 18. In the disc reproducing apparatus 110, the optical disc 200 located at the loading position A is carried to the reproducing section 30 by the loading mechanism 28. The optical disc 200 carried to the reproducing section 30 is clamped by the turn table 71 and the chucking member 74 of the reproducing section 30. Then, the optical disc is rotated by the spindle motor and is irradiated with a laser beam by the optical pick-up 72. The laser beam reflected from the optical disc 200 is received by the optical pick-up 72, and an output signal from the optical pick-up 72 based on the result of light receiving is supplied to the reproducing circuit 12.

On completion of reproduction, in the disc reproducing apparatus 110, the optical disc 200 completed in reproduction is shifted from the reproducing section 30 and housed at the loading position A as the housing position on the rotary table 18 by the loading mechanism 28.

The disc reproducing apparatus 110 thus enables continuous reproduction of the plural optical discs 200. For example, when the user operates the program key 9*a* to command continuous reproduction of the plural optical discs 200, the disc reproducing apparatus 1 carries out continuous reproduction of the optical discs 200 housed on the rotary table 18 by repeating the above-described operation.

In the continuous reproduction, the operation of carrying the optical disc 200 to the reproducing section 30, the reproducing operation, and the operation of returning the optical disc 200 to the loading position A on completion of reproduction are continuously carried out. Specifically, the desired optical disc 200 designated on the basis of the input from the operating section 9 is carried from the rotary table 18 to the reproducing section 30 by the rotational carrier mechanism 27 and the loading mechanism 28 of the disc carrier mechanism, then reproduced by the reproducing section 30, and returned to the loading position A by the disc carrier mechanism on completion of reproduction.

In the disc reproducing apparatus 110 constituted as described above, the optical discs 200 housed in the disc housing section 120 may be relocated by two relocation modes (i.e., a first relocation mode and a second relocation mode). In the disc reproducing apparatus 110, the optical disc 200 completed in reproduction may be housed by a housing mode for housing the optical disc 200 completed in reproduction at a housing position determined on the basis of the information related to the optical disc 200 completed in reproduction. The disc reproducing apparatus 110 is capable of selectively executing any one of the above-mentioned modes.

The first relocation mode is a relocation mode for the disc reproducing apparatus described in the first embodiment. In this first relocation mode, the plural optical discs 200 already housed on the rotary table 18 are relocated and re-arrayed by changing the housing positions thereof on the basis of the information related to the optical disc stored in the disc input information storage area 150*a* of the RAM 150, such as, the category information.

In the disc reproducing apparatus 110, in accordance with the first relocation mode, the disc carrier mechanism is suitably operated on the basis of the information related to the optical discs 200 so as to re-array and relocate the optical discs 200 housed in the respective slits 121 of the disc housing section 120 under the conditions designated by the user with respect to the genre or the singer based the category information. Thus, the optical discs 200 of the same genre or the like may be collected as a group on the rotary table 18.

The second relocation mode is a relocation mode for the disc reproducing apparatus described in the third embodiment. In this second relocation mode, the optical discs 200 are relocated in accordance with the weighting factors calculated by the statistical calculation circuit 80 on the basis of the reproduction hysteresis information stored in the area 150*c* of the RAM 150.

In the disc reproducing apparatus 110, in accordance with the second relocation mode, the disc carrier mechanism is suitably operated on the basis of the reproduction hysteresis information related to the optical discs 200 so as to relocate the optical discs 200 housed in the respective slits 121 of the disc housing section 120 in such a manner that the plural optical discs of a high reproduction frequency are collected at a specified position on the rotary table 18.

The housing mode is a housing mode for the disc reproducing apparatus described in the second embodiment. In this housing mode, the position for housing the optical disc 200 completed in reproduction is changed from the slit as the initial housing position on the rotary table 18 on the basis of the information related to the optical disc 200 completed in reproduction, such as, the category information, so as to return and house the optical disc 200 completed in reproduction in a slit adjacent to or close to a housing position on the rotary table 18 where an optical disc having the same category information as the optical disc 200 completed in reproduction is housed.

In the disc reproducing apparatus 110, in accordance with the housing mode, the disc carrier mechanism is suitably operated on the basis of the information related to the optical disc 200 completed in reproduction so as to house the optical disc 200 completed in reproduction in the slit 121 on the rotary table 18 in such a manner that the optical disc 200 completed in reproduction and at least one optical disc having the same category information as the optical disc 200 completed in reproduction are collected in one group.

Thus, in the disc reproducing apparatus 110, the housing position of the optical disc 200 may be changed or determined on the basis of the information related to the optical disc 200, such as, the category information, or the reproduction hysteresis information.

In the disc reproducing apparatus 110, the optical discs of the same category or the optical discs of a high reproduction frequency are housed at neighboring housing positions on the rotary table 18 after execution of any of the above-described modes. Therefore, in the case where the optical discs 200 of the same category or the optical discs of a high reproduction frequency are continuously reproduced, the disc carrier mechanism can quickly take out and house a desired optical disc 200 from the rotary table 18 so as to carry the desired optical disc 200 to the reproducing section 30. Thus, in the disc reproducing apparatus 110, the time required for exchanging the optical discs 200 in carrying out continuous reproduction of the optical discs, that is, the time required for taking out and returning the disc from the reproducing section 30 and for taking out a new optical disc from the rotary table and loading the new optical disc to the reproducing section, may be reduced.

Since the operation of carrying the optical disc 200 by the disc carrier mechanism may be minimized, the disc reproducing apparatus enables reduction in power consumption at the time of continuous reproduction. By minimizing the operation of carrying the optical disc, the driving noise of the disc carrier mechanism due to the operation of carrying the optical disc may be reduced.

Since the optical discs 200 are housed by each category in the disc reproducing apparatus 110, the user may easily manage the optical discs 200. Therefore, the user need not carry out any troublesome operation to find a slot as the housing position on the rotary table 18 for each category.

In the recording medium reproducing apparatus according to the present invention, the carrier means is controlled on the basis of recording medium-related information, and a recording medium housed in the housing section is relocated. Thus, plural recording media may be housed to be arrayed in the housing section.

Therefore, the recording medium reproducing apparatus enables reduction in time for exchanging recording media in carrying out continuous reproduction of the recording media. With the reproducing apparatus of the present invention, the user can simplify the management of recording media.

In the above-described embodiments, the reproducing apparatus using optical discs as recording media is described. However, the present invention may also be applied to a reproducing apparatus which uses tape cassettes housing magnetic tapes therein as recording media.

As a matter of course, the present invention is not limited to the above-described embodiments, and various modifications may be effected without departing from the scope of the present invention.

What is claimed is:

1. A recording medium reproducing apparatus comprising:
    a housing section for housing a plurality of recording media;
    a reproducing section for reproducing a recording medium;
    a carrier mechanism for taking out a recording medium from the housing section and carrying the recording medium to the reproducing section; and
    a controller for controlling the reproducing section and the carrier mechanism, the controller controlling the carrier mechanism on the basis of recording medium-related information pertaining to recording media housed in the housing section, so as to carry out relocation of recording media housed in the housing section, and
wherein the controller generates the recording medium-related information on the basis of reproduction hysteresis information pertaining to recording media reproduced by the reproducing section, and carries out relocation of recording media on the basis of the generated recording medium-related information.

2. The recording medium reproducing apparatus of claim 1, wherein the controller has a storage section for storing the recording medium-related information.

3. The recording medium reproducing apparatus of claim 2, wherein the controller controls the carrier mechanism to carry out relocation of the recording media in such a manner that recording media having the same generated recording medium-related information are adjacently arrayed in a housing area of the housing section on the basis of recording medium-related information read out of the storage section.

4. The recording medium reproducing apparatus of claim 1, wherein the controller carries out relocation of the recording media during a predetermined time period when the recording medium reproducing apparatus is not otherwise in use.

5. The recording medium reproducing apparatus of claim 1, wherein the controller generates recording medium-related information indicating a reproduction frequency by carrying out a calculation based on the reproduction hysteresis information, and carries out relocation of recording media in such a manner that recording media having a high reproduction frequency are adjacently arrayed in a housing area of the housing section on the basis of the generated medium-related information.

6. The recording medium reproducing apparatus of claim 1, wherein the controller has a storage section for storing the reproduction hysteresis information, and a calculating section for calculating a reproduction frequency on the basis of reproduction hysteresis information read out of the storage section.

7. A control method for a recording medium reproducing apparatus, the apparatus having a housing section for housing a plurality of recording media, a reproducing section for reproducing a recording medium, a carrier mechanism for taking out a recording medium from the housing section and carrying the recording medium to the reproducing section, and a storage section in which recording medium-related information pertaining to the recording media housed in the housing section is written, the method comprising the steps of:
    reading out the recording medium-related information from the storage section; and
    controlling the carrier mechanism on the basis of the read out recording medium-related information so as to carry out relocation of the recording media housed in the housing section, and
wherein the controlling step includes generating the recording medium-related information on the basis of reproduction hysteresis information pertaining to recording media reproduced by the reproducing section so as to carry out relocation of recording media on the basis of the generated recording medium-related information.

8. The control method for a recording medium reproducing apparatus of claim 7, wherein the carrier mechanism is controlled in such a manner that recording media having the same recording medium-related information are adjacently arrayed in a housing area of the housing section on the basis of the recording medium-related information read out of the storage section.

9. The control method for a recording medium reproducing apparatus of claim 7, wherein the carrier mechanism is controlled to house a recording medium, which has completed reproduction, by the reproducing section into a housing area of the housing section where any other recording media having the same recording medium-related information as the recording medium, which has completed reproduction, is housed on the basis of the recording medium-related information read out of the storage section.

10. The control method for a recording medium reproducing apparatus of claim 9, wherein the carrier mechanism is controlled to carry the recording medium, which has completed reproduction, to a free area near the housing area when there is no free area in the housing area.

11. The control method for a recording medium reproducing apparatus of claim 9, wherein the carrier mechanism is controlled to house the recording medium, which has completed reproduction, in its initial housing position in the housing section when recording medium-related information pertaining to the recording medium, which has completed reproduction, is not in the storage section.

12. A recording medium reproducing apparatus comprising:
    a housing section for housing a plurality of recording media;
    a reproducing section for reproducing a recording medium;
    a carrier mechanism for taking out a recording medium from the housing section and carrying the recording medium to the reproducing section; and
    a controller for controlling the reproducing section and the carrier mechanism, the controller having a storage section in which recording medium-related information pertaining to recording media housed in the housing section is stored, the controller reading out the recording-medium related information from the storage section and controlling the carrier mechanism on the basis of the read out recording medium-related information so as to carry out relocation of recording media housed in the housing section, and
wherein the controller generates the recording medium-related information on the basis of reproduction hysteresis information pertaining to recording media reproduced by the reproducing section, and carries out relocation of recording media on the basis of the generated recording medium-related information.

13. The recording medium reproducing apparatus of claim 12, wherein the controller controls the carrier mechanism to house a recording medium, which has completed reproduction, by the reproducing section into a housing area of the housing section where any other recording media having the same recording medium-related information as the recording medium, which has completed reproduction, is housed on the basis of recording medium-related information read out of the storage section.

14. The recording medium reproducing apparatus of claim 13, wherein the controller controls the carrier mechanism to carry the recording medium, which has completed reproduction, to a free area near the housing area when there is no free area in the housing area.

15. The recording medium reproducing apparatus of claim 13, wherein the controller controls the carrier mechanism to house the recording medium, which has completed reproduction, in its initial housing position in the housing section when recording medium-related information pertaining to the recording medium, which has completed reproduction, is not in the storage section.

16. The recording medium reproducing apparatus of claim 12, wherein the controller generates recording medium-related information indicating a reproduction frequency by carrying out a calculation based on the reproduction hysteresis information, and carries out relocation of the recording media in such a manner that recording media having a high reproduction frequency are adjacently arrayed in a housing area of the housing section on the basis of the generated medium-related information.

17. The recording medium reproducing apparatus of claim 16, wherein the controller has a storage section for storing the reproduction hysteresis information, and a calculating section for calculating a reproduction frequency on the basis of reproduction hysteresis information read out of the storage section.

18. The recording medium reproducing apparatus of claim 17, wherein the controller carries out relocation of the recording media during a predetermined time period when the recording medium reproducing apparatus is not otherwise in use.

19. The recording medium reproducing apparatus of claim 12, wherein the controller controls the carrier mechanism so as to carry out relocation of the recording media in such a manner that recording media having the same recording medium-related information are adjacently arrayed in a housing area of the housing section on the basis of recording medium-related information read out of the storage section.

20. A recording medium reproducing apparatus comprising:
a housing section for housing a plurality of recording media;
a reproducing section for reproducing a recording medium;
a carrier mechanism for taking out a recording medium from the housing section and carrying the recording medium to the reproducing section; and
a controller for controlling the reproducing section and the carrier mechanism, the controller controlling the carrier mechanism on the basis of recording medium-related information pertaining to the recording media housed in the housing section in such a manner that a recording medium, which has completed reproduction, by the reproducing section is housed in a housing area of the housing section where any other recording media having the same recording-medium related information pertaining thereto as the recording medium, which has completed in reproduction, is housed and
wherein the controller generates the recording medium-related information on the basis of reproduction hysteresis information pertaining to recording media reproduced by the reproducing section, and carries out relocation of recording media on the basis of the generated recording medium-related information.

21. The recording medium reproducing apparatus of claim 20, wherein the controller controls the carrier mechanism to carry the recording medium, which has completed reproduction, to a free area near the housing area when there is no free area in the housing area.

22. The recording medium reproducing apparatus of claim 20, wherein the controller has a storage section for storing the recording medium-related information.

23. The recording medium reproducing apparatus of claim 22, wherein the controller controls the carrier mechanism to house the recording medium, which has completed reproduction, in its initial housing position in the housing section when recording medium-related information pertaining to the recording medium, which has completed reproduction, is not in the storage section.

24. A recording medium reproducing apparatus comprising:
a housing section for housing a plurality of recording media;
a reproducing section for reproducing a recording medium;
a carrier mechanism for taking out a recording medium from the housing section and carrying the recording medium to the reproducing section; and
a controller for controlling the reproducing section and the carrier mechanism, the controller carrying out relocation of recording media housed in the housing section on the basis of reproduction hysteresis information pertaining to recording media reproduced by the reproducing section.

25. The recording medium reproducing apparatus of claim 24, wherein the controller carries out relocation of the recording media during a predetermined time period when the recording medium reproducing apparatus is not otherwise in use.

26. The recording medium reproducing apparatus of claim 24, wherein the controller generates recording medium-related information indicating a reproduction frequency by carrying out a calculation using the reproduction hysteresis information, and carries out relocation of the recording media in such a manner that recording media having a high reproduction frequency are adjacently arrayed in a housing area of the housing section on the basis of the generated recording medium-related information.

27. The recording medium reproducing apparatus of claim 26, wherein the controller has a storage section for storing the reproduction hysteresis information for each recording medium housed in the housing section, and a calculating section for calculating the reproduction frequency on the basis of reproduction hysteresis information read out of the storage section.

28. A control method for a recording medium reproducing apparatus, the apparatus having a housing section for housing a plurality of recording media, a reproducing section for reproducing a recording medium, a carrier mechanism for taking out a recording medium from the housing section and carrying the recording medium to the reproducing section, and a storage section in which reproduction hysteresis information pertaining to each of the recording media housed in the housing section is written, the method comprising the steps of:

reading out the reproduction hysteresis information from the storage section; and controlling the carrier mechanism on the basis of the read out reproduction hysteresis information so as to carry out relocation of the recording media housed in the housing section.

29. The control method for a recording medium reproducing apparatus of claim 28, wherein recording medium-related information indicating a reproduction frequency is generated by carrying out a calculation using the reproduction hysteresis information, and relocation of the recording media is carried out in such a manner that recording media having a high reproduction frequency are adjacently arrayed in a housing area of the housing section on the basis of the generated recording medium-related information.

30. The control method for a recording medium reproducing apparatus of claim 28, wherein the controller carries out relocation of the recording media during a predetermined time period when the recording medium reproducing apparatus is not otherwise in use.

* * * * *